United States Patent [19]

Asoh et al.

[11] Patent Number: 5,054,847
[45] Date of Patent: Oct. 8, 1991

[54] FLEXIBLE TOP APPARATUS FOR A VEHICLE

[75] Inventors: Seiichi Asoh; Satoshi Kubota; Hitoki Fukuda; Kajuhiro Ushijima; Fumiyuki Murakami; Tomoo Taguchi; Shigefumi Kohno, all of Hiroshima, Japan

[73] Assignee: Mazda Motor Corporation, Hiroshima, Japan

[21] Appl. No.: 367,749

[22] Filed: Jun. 19, 1989

[30] Foreign Application Priority Data

Jun. 20, 1988 [JP] Japan .............................. 63-153291
Jun. 28, 1988 [JP] Japan .............................. 63-162045

[51] Int. Cl.⁵ .............................................. B60J 7/06
[52] U.S. Cl. ..................................... 296/219; 296/124
[58] Field of Search .............. 296/107, 109, 124, 127, 296/219, 136

[56] References Cited

U.S. PATENT DOCUMENTS

| | | | |
|---|---|---|---|
| 2,694,598 | 11/1954 | Ulrich | 296/107 |
| 2,747,928 | 5/1956 | Olivier et al. | 296/136 X |
| 2,770,489 | 11/1956 | Garvey et al. | 296/117 |
| 2,785,922 | 3/1957 | Chika | 296/107 |
| 2,845,299 | 7/1958 | Pickering | 296/136 |
| 2,985,483 | 5/1961 | Bishop et al. | 296/219 X |
| 3,338,624 | 8/1967 | Champion | 296/136 |
| 3,357,738 | 12/1967 | Bourlier | 296/219 X |
| 3,823,977 | 7/1974 | Fioravanti | 296/107 |

FOREIGN PATENT DOCUMENTS

| | | | |
|---|---|---|---|
| 439249 | 9/1948 | Italy | 296/105 |
| 475695 | 11/1952 | Italy | 296/107 |
| 82883 | 4/1988 | Japan | 296/180.1 |
| 444907 | 3/1936 | United Kingdom | 296/219 |

Primary Examiner—Johnny D. Cherry
Assistant Examiner—Gary C. Hoge
Attorney, Agent, or Firm—Fish & Richardson

[57] ABSTRACT

A roof panel connected to the vehicle body through at least a pair of left-hand and right-hand front pillars and a pair of left-hand and right-hand rear pillars is provided with a wide open roof panel opening enclosed by a front header, a pair of left-hand and right-hand roof side rails and a rear header. To the pair of left-hand and right-hand rear pillars and the rear header is fixed a rear window glass panel. In order to close the roof panel opening, there is provided a flexible top foldable or windable.

When the roof panel opening is in a closed state, a forward end portion of the flexible top is in abutment with said front header, its left-hand and right-hand side end portions are abutted with the left-hand and right-hand roof side rails, and its rearward end portion is in abutment with the rear header. The flexible top is displaceable along the roof side rails and the rear pillars. When the roof panel opening is in an open state, the flexible top is housed or accommodated in a folded or wound state at a position rearward of the rear window glass panel and nearby its lower end portion.

20 Claims, 23 Drawing Sheets

FIG. I

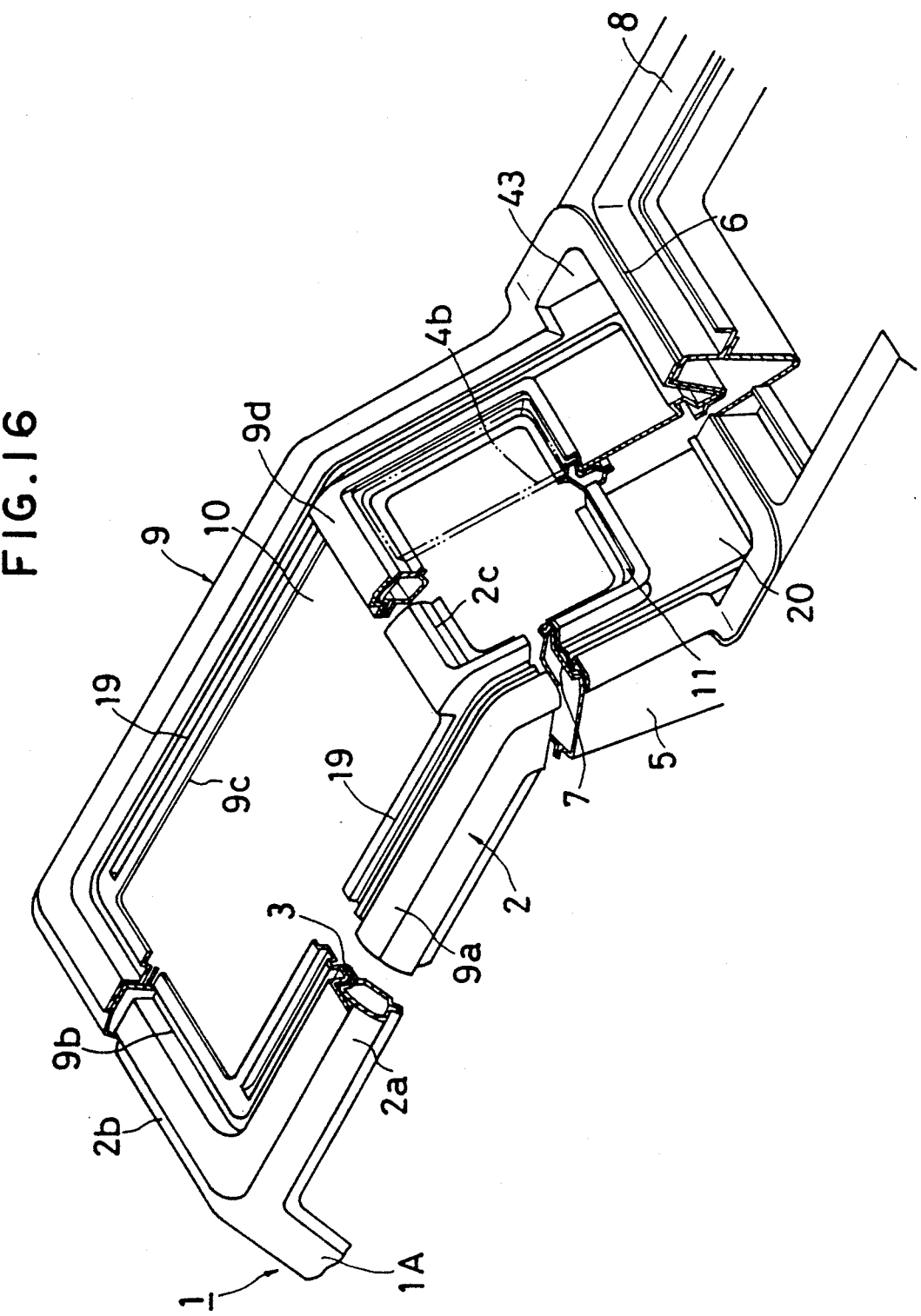

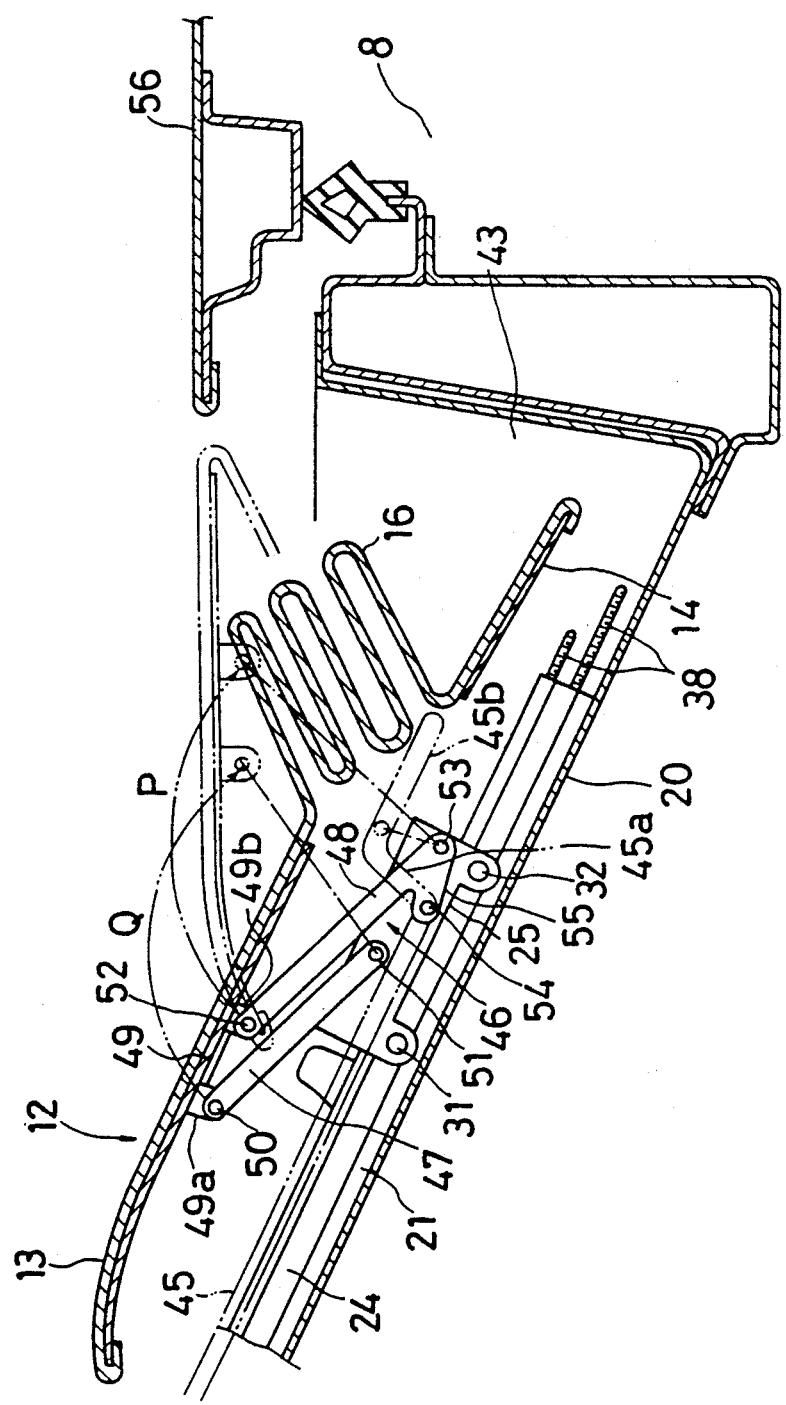

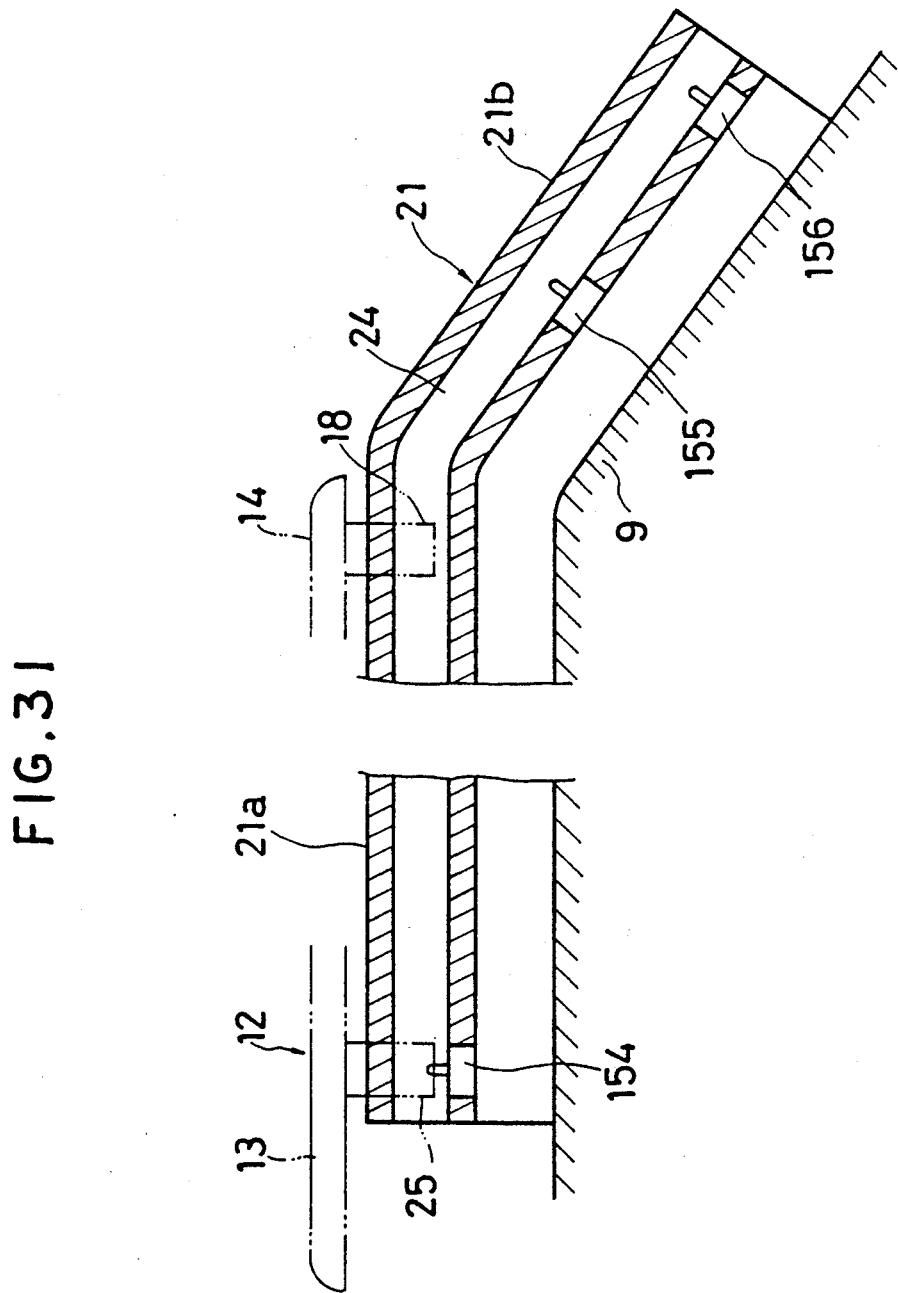

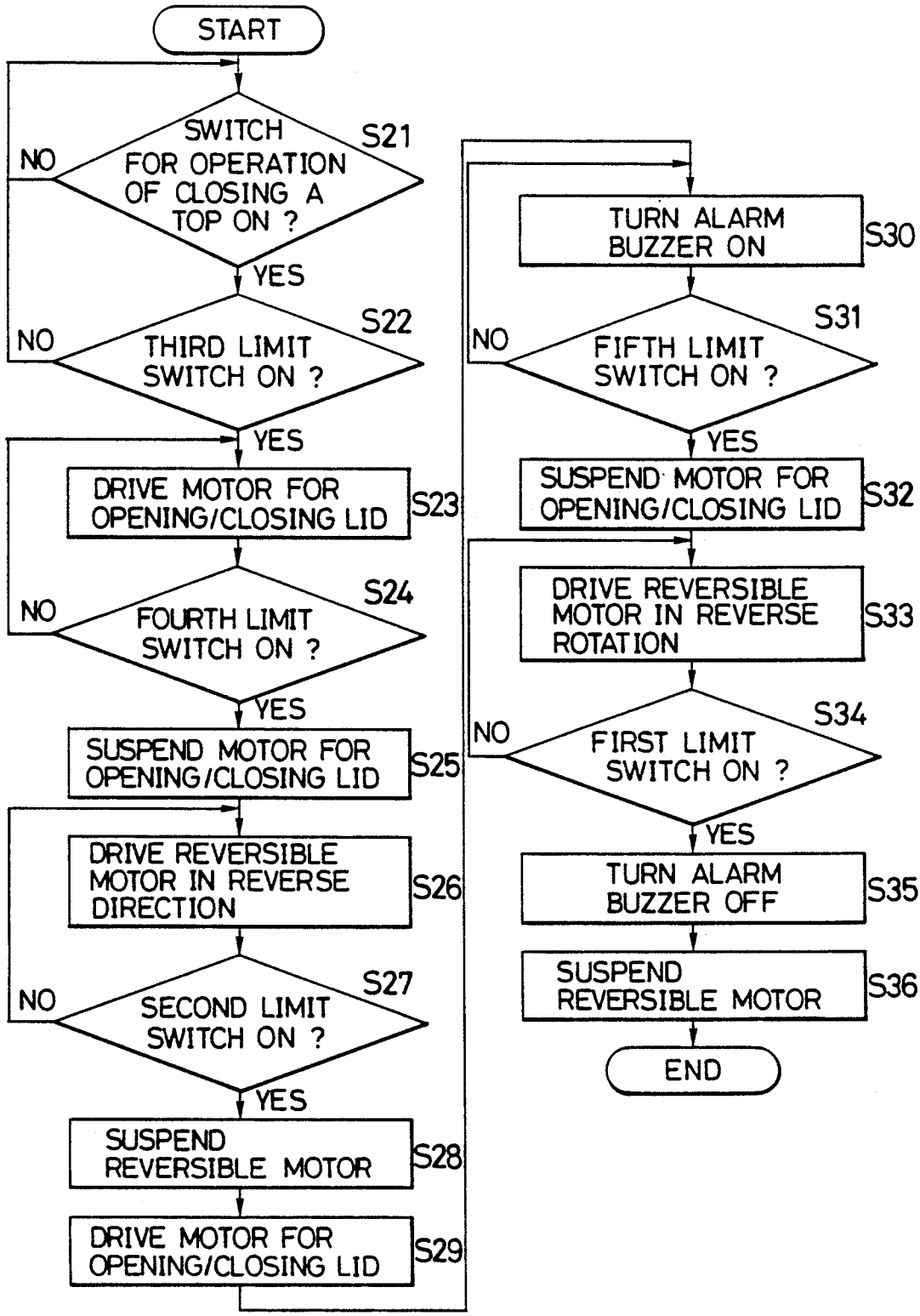

FLEXIBLE TOP APPARATUS FOR A VEHICLE

FIELD OF THE INVENTION

The present invention relates to a flexible top apparatus for a vehicle, such as an automobile.

BACKGROUND OF THE INVENTION

There is an automobile in which an upper portion of the vehicle chamber is open so that the passengers may enjoy the open air.

The automobile of the open air type requires a member for covering its vehicle chamber to be used when required or needed as when it rains. Such a member may be a foldable or windable flexible sheet, or a top.

Representative of such an automobile is the full open type, which can be called the Cabriole type. An automobile of the full open type as disclosed in U.S. Pat. No. 4,572,570 is basically of a type designed to allow an upper portion and a rearward upper portion of its vehicle chamber to be fully open. More specifically, the automobile is provided with a front window glass panel, but no rear pillar is provided which is otherwise required in order to support the roof panel and the rearward end portion of the roof panel. Although the automobile of the full open type has the advantage that its vehicle chamber can be opened wide to the air, it poses various difficulties at the same time. The rigidity of the vehicle body is not much enhanced by this structure because neither the roof panel nor the rear pillar is mounted to the body. Such a flexible top should be constructed in such a shape as to cover both the rearward upper portion of the vehicle chamber and the upper portion thereof when 1 closed, thus complicating its structure. Furthermore, the sealing performance of the flexible top is poor when it closes the vehicle chamber.

As a result of these difficulties, the flexible top type automobile (see U. K. Patent Specification No. 1,315,364) is increasingly common. The automobile of the flexible top or canvas top type has only an opening formed on a roof panel - such an opening being referred to herein as "roof panel opening" which is covered (closed) or uncovered (opened) with a flexible sheet. The automobile of this flexible top type is provided with a roof panel having a wide opening, called the "roof panel opening," connected to the vehicle body at least through front and rear pillars in such a manner that the roof panel opening is closed or opened by the flexible top. More specifically, the roof panel is of the type such that its whole middle portion is wide open as a roof panel opening except for its front header, its left-hand and right-hand side rails, and its rear header. In other words, the front and rear headers and the side rails constitute a four-sided periphery of the roof panel opening. A front window glass panel is fixed by the left-hand and right-hand front pillars and the front header, while a rear window glass panel is fixed by the left-hand and right-hand rear pillars and the rear header.

The flexible top is in a closed state when it fully closes the roof panel opening. The flexible top is designed such that its forward end is brought into abutment with the front header of the roof panel, its left-hand and right-hand side end portions are in abutment with the left-hand and right-hand roof side rails, and its rearward end abuts with the rear header. This arrangement ensures sufficient rigidity of the vehicle body to a sufficient extent because a framework of the upper periphery of the vehicle chamber is formed by the left-hand and right-hand front pillars, front header, left-hand and right-hand roof side rails as well as rear header, such members being connected to each other. This structure further provides the advantage of simplicity because the flexible top is designed simply to open or close the roof panel opening. Furthermore, it presents the advantage that most common automobiles with a roof panel supported with front and rear pillars can be converted to those of flexible top type by small modifications. For the above reasons, recently the numbers of automobiles of the flexible top type have increased dramatically.

The automobile of the flexible top type is designed so as to take either a closed posture, or to be in a closed state, or an open posture, or to be in an open state. In the closed posture, the roof panel opening is closed by fixing a rearward end portion of the flexible top to the rear header while abutting a forward end portion of the top to the front header. In the open posture, the roof panel opening is opened wide by transferring the forward end portion of the top rearwardly toward the rear header. In this open posture, the flexible top is housed or accommodated in a folded or wound state.

For the automobiles of the conventional flexible top type, however, the flexible top in its housed state is still extends widely in a longitudinal direction so that it covers a considerable portion of the roof panel opening, thus impairing the feeling of openness for the passengers. It is further to be noted that, as the roof panel opening is open while the flexible top is housed, the flexible top is in a state that it projects upwardly from the top of the vehicle to a considerable extent, thus increasing air resistance and producing noises from wind blowing.

SUMMARY OF THE INVENTION

Therefore, the present invention has the object to provide a flexible top apparatus for a vehicle, such as an automobile, capable of opening an upper portion of its vehicle chamber and housing a flexible top so as to cause no resistance to air during running.

In order to achieve this object, the flexible top apparatus for a vehicle according to this invention includes:

a roof panel connected to a vehicle body through at least a pair of left-hand and right-hand front pillars.

This roof panel has a front header, a pair of left-hand and right-hand roof side rails and a rear header, which are disposed so as to enclose a roof panel opening. A rear window glass panel is fixed to the pair of left-hand and right-hand rear pillars and said rear header.

A flexible top which is foldable or windable in a direction longitudinal to the vehicle body is as large in size in its extended state as is the roof opening. Of course, this flexible top acts to close the roof panel opening if it is desired to do so.

The forward end portion of the flexible top, when closed, abuts the front header, its left-hand and right-hand side end portions abut the left-hand and right-hand roof side rails, and its rearward portion abuts the rear header. When the roof panel opening is in a closed state, the flexible top is in an extended state and covers the roof opening.

The flexible top selectively takes a first posture and a second posture when the flexible top is displaced along the pair of left-hand and right-hand roof side rails and the pair of left-hand and right-hand rear pillars. The first posture is taken when the flexible top is in the closed state and the second posture is taken when said flexible top is open and housed or accommodated in a folded or wound state at a position to the rear of and below the lower end of the rear window glass panel.

This invention, as described hereinabove, permits housing the flexible top to the rear of and below the lower end of the rear window glass panel, so that the housing of the flexible top does not block the roof panel opening and does not cause an increase in air resistance while the vehicle is moving.

BRIEF DESCRIPTION OF THE DRAWINGS

Other objects, features and advantages of the present invention will become apparent in the course of the description of the preferred embodiments which follows when interpreted in the light of the accompanying drawings, in which:

FIGS. 1 to 13 are directed to the first embodiment of the flexible top apparatus of a vehicle according to the present invention, in which:

FIG. 1 is a perspective view showing an outline of top and rearward portions of the vehicle body when looked at from the rear;

FIG. 2 is a perspective view showing the mounting relation of the vehicle body with the base frame in a state in which the flexible top is excluded, corresponding to FIG. 1;

FIG. 3 is a cross-sectional view taken along the line 3—3 of FIG. 1;

FIG. 4 is a cross-sectional view taken along the line 4—4 of FIG. 1;

FIG. 5 is a cross-sectional view taken along the line 5—5 of FIG. 1;

FIG. 6 is a cross-sectional view taken along the line 6—6 of FIG. 1;

FIG. 7 is a cross-sectional view taken along the line 7—7 of FIG. 1;

FIG. 8 is a cross-sectional view taken along the line 8—8 of FIG. 1;

FIG. 9 is a perspective view showing one example of the top;

FIG. 10 is a cross-sectional side view showing a manner of operation of the top;

FIGS. 11 (a) and (b) are cross-sectional views showing the connection of the forward portion of the top, in which FIG. 11 (a) shows the top in a closed state and FIG. 11 (b) shows the top immediately prior to the opening of the top;

FIG. 12 is a perspective view showing a detail of a drive means for driving the top; and FIGS. 13 (a) and (b) are perspective views showing states of the top, in which FIG. 13 (a) shows the top at its first posture, or in a closed state.

FIGS. 14 to 18 are directed to the second embodiment of the flexible top apparatus, in which:

FIG. 14 is a perspective view corresponding to FIG. 1;

FIG. 15 is a cross-sectional view taken along the line 15—15 of FIG. 14;

FIG. 16 is a perspective view corresponding to FIG. 2;

FIG. 17 is a cross-sectional side view showing operation of the top during housing or accommodation;

FIG. 18 is an exploded perspective view showing a detail of the forward end portion of the top FIGS. 19 to 26 ar directed to the third embodiment of the flexible top apparatus, in which:

FIGS. 27 to 35 are directed to the fourth embodiment of the flexible top apparatus according to the present invention, in which:

FIG. 27 is a perspective view corresponding to FIG. 1;

FIG. 28 is a perspective view corresponding to FIG. 2;

FIG. 29 is a cross-sectional view showing operation of a subsidiary lid;

FIG. 30 is a perspective view showing the inside of a subsidiary trunk room;

FIG. 31 is a briefed side view showing a disposition of switches for sensing positions of the top;

FIGS. 32(a) and (b) are perspective views showing a state of the top, in which FIG. 32(a) shows the top in a closed posture and FIG. 32(b) shows the top in an open posture;

FIG. 33 is a block diagram showing drive control system; and

FIGS. 34 and 35 are flowcharts showing control of the drive control system.

DETAILED DESCRIPTION OF THE INVENTION

The present invention will be described more in detail with reference to the accompanying drawings.

First Embodiment

FIGS. 1 to 11 are directed to the first embodiment of a structure of the canvas top for a vehicle, such as an automobile, in accordance with the present invention.

Figure 1:
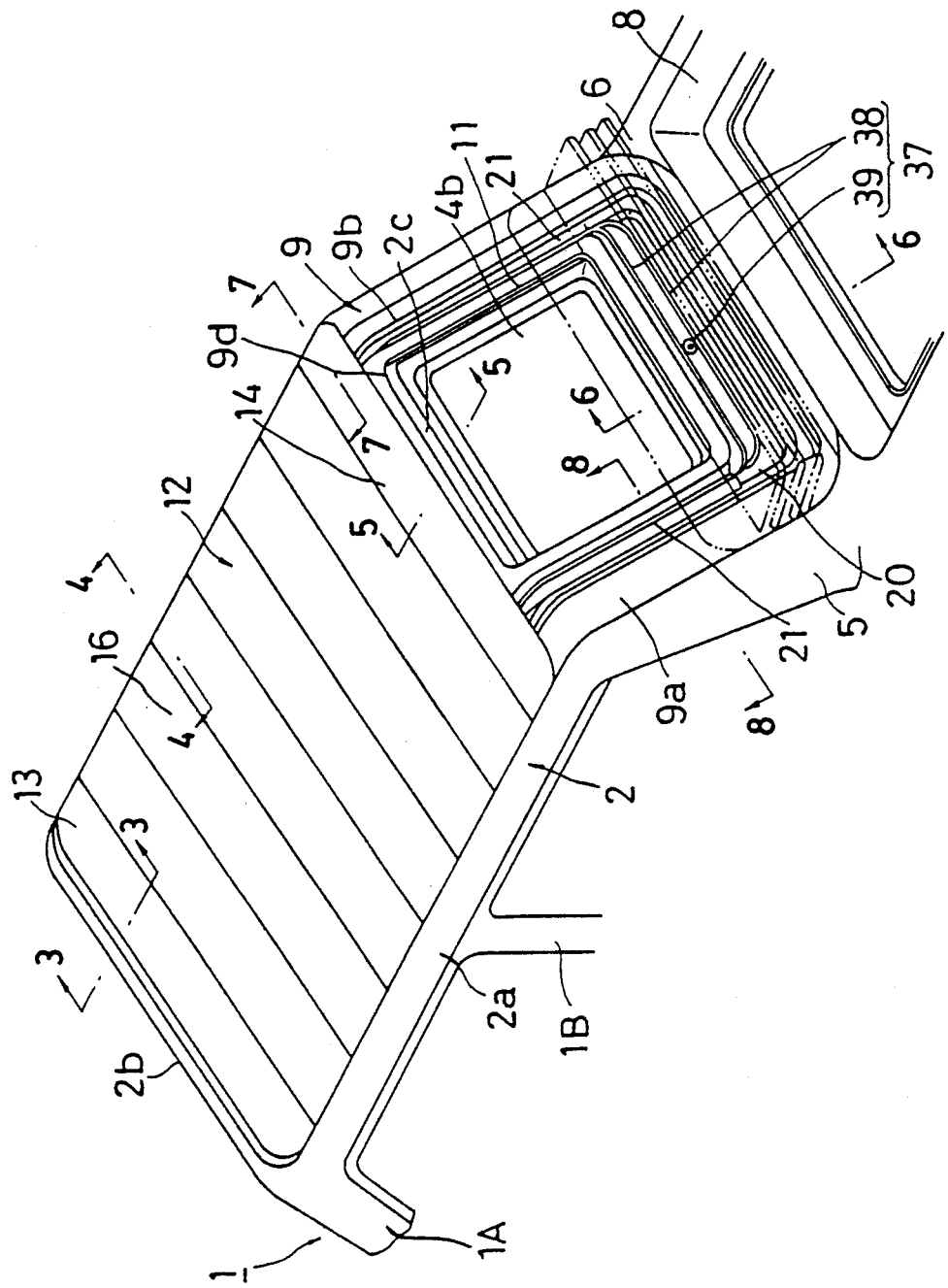
Figure 2:
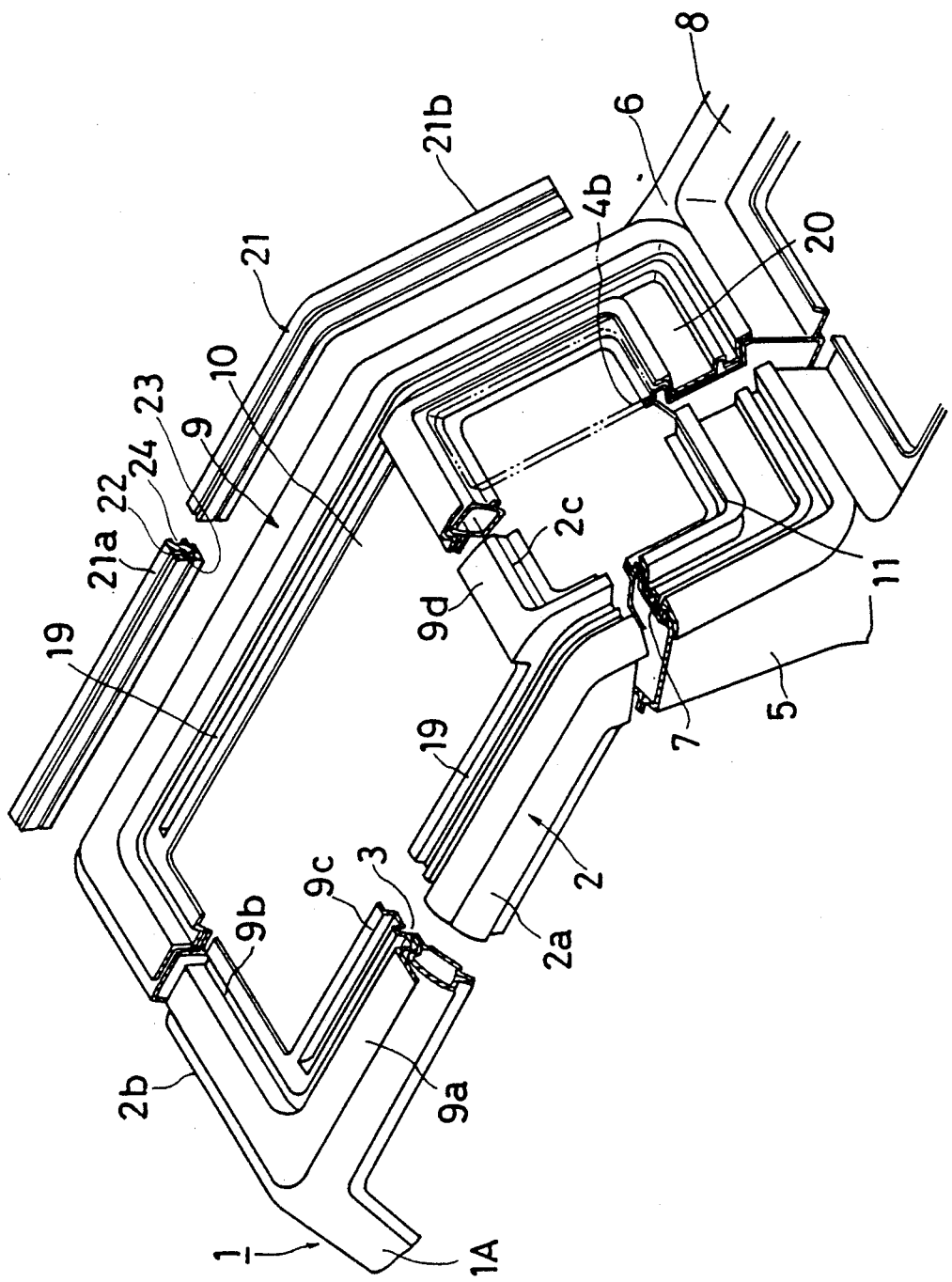
Figure 5:
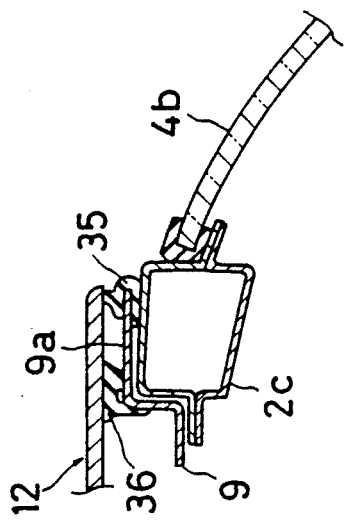
Figure 3:
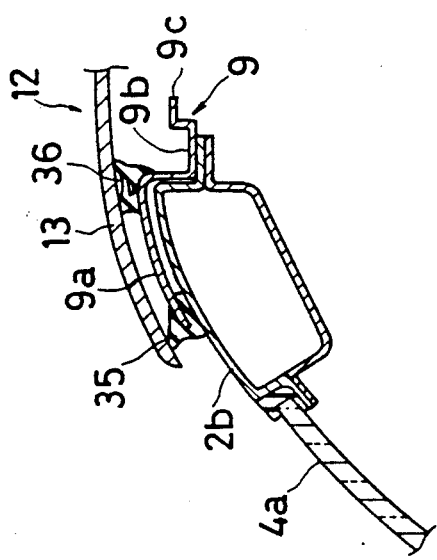
Figure 8:
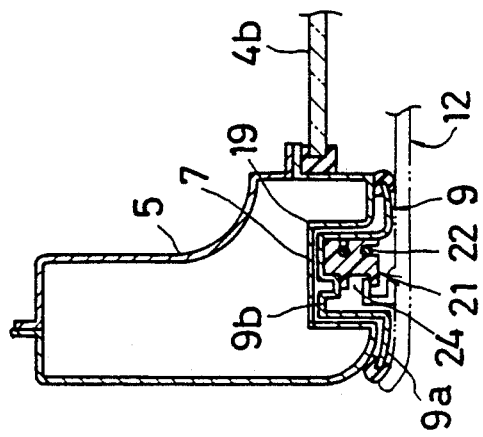

As shown specifically in FIG. 2, the vehicle is provided with a roof panel 2 which is connected to the vehicle body 1 through a pair of left-hand and right-hand front pillars 1A, a pair of left-hand and right-hand center pillars 1B, and a pair of left-hand and right-hand rear pillars 1C. The roof panel 2 is provided over substantially its whole upper area with roof panel opening 3 which is enclosed by left-hand and right-hand roof side rails 2a and 2a as well as by front and rear headers 2b and 2c, respectively. On a forward side of the front header 2b is disposed a forward windshield glass panel 4a as shown in FIG. 3, while a rear windshield glass panel 4b is disposed on a rearward side of the rear header 2c as shown in FIG. 5. The left-hand and right-hand roof side rails 2a 2a are extended, respectively, to comprise rear pillars 5, 5 so as to engage both edge portions of the rear windshield glass panel 4b which, in turn, is interposed at its forward and rearward edge portions between the rearward side of the rear header 2c and a rear deck 6, respectively. The front glass window glass 4a is fixed to the pair of left-hand and right-hand front pillars 1A and the front header 2b, while the rear window glass panel 4b is fixed to the pair of left-hand and right-hand rear pillars and the rear header 2c. The rear pillars 5, 5 and the rear deck 6 are provided each with a groove 7 in which a base frame 9 for a flexible top, or a canvas top, is inserted as will be described hereinbelow. The groove 7 is continuously integral with an inner edge of each of the roof side rails 2a and 2a of the roof panel 2. As shown in FIGS. 1 and 2, reference numeral 8 denotes a trunk room.

As shown in FIGS. 1 and 2, the base frame 9 is of a shape such that it can be inserted in the roof side rails 2a, 2a, the front header 2b and the rear header 2c as well as in the groove 7 formed on the rear pillars 5, 5 and the rear deck 6. In other words, the base frame 9 is provided with an opening 10 on the roof side and an opening 11 on the windshield glass side corresponding, respectively, to the roof panel opening 3 and the rearward windshield glass panel 4b. The base frame 9 comprises an outward ring-shaped flange portion 9a in abutment with the roof side rails 2a, 2a, the front header 2b, the rear pillars 5, 5, and the rear deck 6, a ring-shaped rain rail portion 9b formed on an inner peripheral side of the flange portion 9a, and an inward flange portion 9c formed as an extension portion on an inner peripheral side of the rain rail portion 9b. Between the openings 10 and 11 is provided a partition portion 9d in abutment with the rear header 2c.

Figure 7:
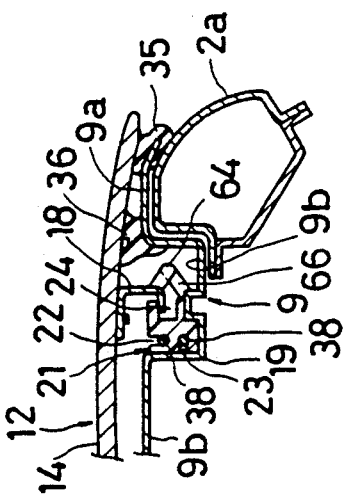
Figure 9:
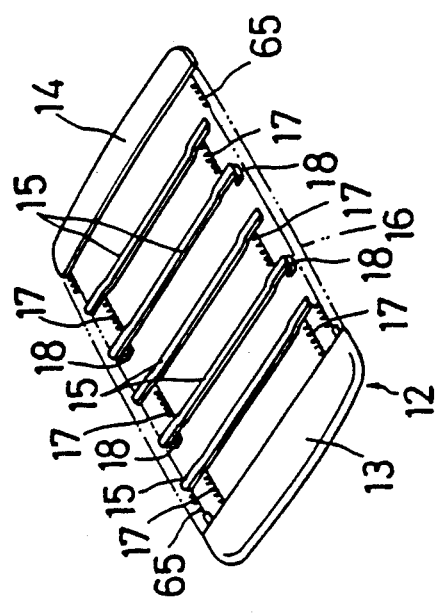
Figure 10:
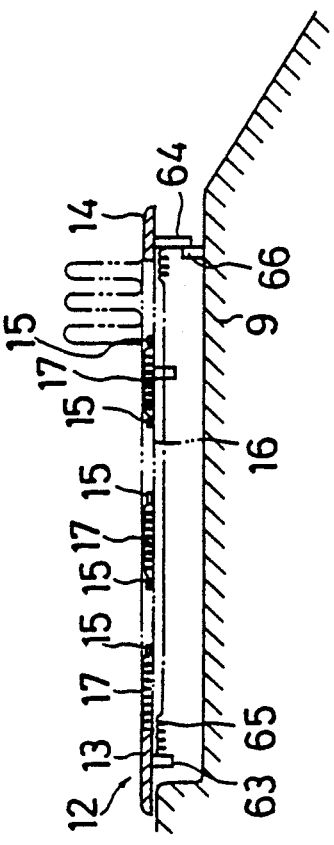

The opening 10 is covered or uncovered with a top 12 functioning as a flexible top or as a canvas top. As shown in FIG. 9, the top 12 comprises a front hard portion 13 of a hard plate form located on its forward side, a rear hard portion 14 of a hard plate form located on its rearward side, five skeleton members, generally referred to as 15, disposed longitudinally at substantially equal intervals so as to transversely elongate or bridge between both sides of the opening 10, and a leather top portion 16 connecting the hard portions 13 and 14 to each other and connecting the skeleton members 15 to each other. The top 12 is further designed so as to be foldable for housing by interposing each of three springs, generally referred to as 17, between the front hard portion 13 and the first row of the skeleton member 15, the second and third rows thereof, and the fourth and fifth row thereof, respectively, as shown by the chain line in FIG. 1. As shown in FIG. 9, the rear hard portion 14 and the second and fourth rows of the skeleton members 15, 15 are provided at each of their both side end portions with an L-shaped guide piece, generally referred to as 18, projecting in a downward direction. As shown in FIG. 10, front and rear projections 63 and 64 are provided, respectively, on bottom surfaces of the front and rear hard portions 13 and 14 and an urging means 65 is interposed between the front and rear projections 63 and 64. The urging means 65 provides an urging force to cause the front and rear hard portions 13 and 14 to come relatively closer to each other; its length is determined so as to allow the top 12 in a folded state to become free, as shown by the dotted line in FIG. 10. The rear projection 64 provided on the side of the rear hard portion 14 of the top 12 is designed so as to be engageable with an engagement piece 66 projecting from the inward flange portion 9c located on the rearward edge on the roof side of the base frame 9. At this point the flexible top is shown by dotted lines in FIG. 10 to assume a posture in which it is contracted in a position near the rear header. In other words, as shown in FIGS. 7 and 10, the rear projection 64 serves as a stopper mechanism for determining the location of the rear hard portion 14 at the rear edge of the opening 10 on the roof side in a state in which the opening 10 is covered with the top 12. On the other hand, as shown in FIG. 10, the front projection 63 provided on the front hard portion 13 of the top 12 is shorter than the rear projection 64 and cannot be engaged with the engagement piece 66 on the side of the base frame 9. In FIGS. 3 and 7, reference numerals 35 and 36 denote each a seal member for sealing a gap between the top 12 and the base frame 9.

Figure 6:
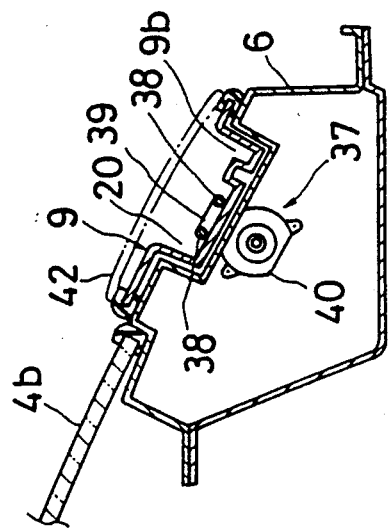

As shown in FIG. 6, the inward flange portion 9c of the base frame 9 is provided at its both sides in a longitudinal direction each with an engagement groove 19 for mounting a guide rail 21 for guiding a movement of the top 12. The engagement groove 19 communicates at its rearward end with a wide communication groove extending in a transverse direction.

Figure 4:
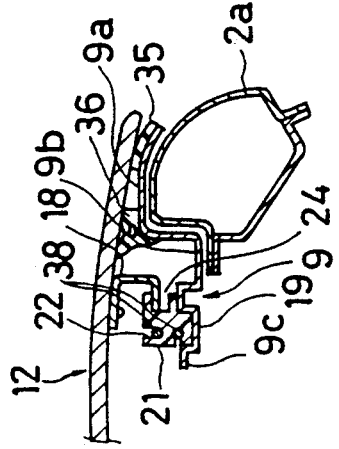

Turning back to FIG. 2, each of the guide rails 21 is shown to comprise a first guide portion 21a located at the corresponding side of the opening 10 on the roof side and a second guide portion 21b elongated integrally from a rear end of the first guide portion 21a. The guide rail 21 is provided with an upper guide groove 22 and a lower guide groove 23, both of which extend in the longitudinal direction of the vehicle body. FIGS. 4, 6 and 7 show drive wires 38 and 38 constituting part of a drive means 37 for transferring the top 12, which are slidably inserted in the guide grooves. A rail portion 24 for guiding slidably the guide pieces 18 is mounted on both side portions of the rear hard portion 14 and the skeleton members 15 and 15 of the top 12.

Figure 11A:
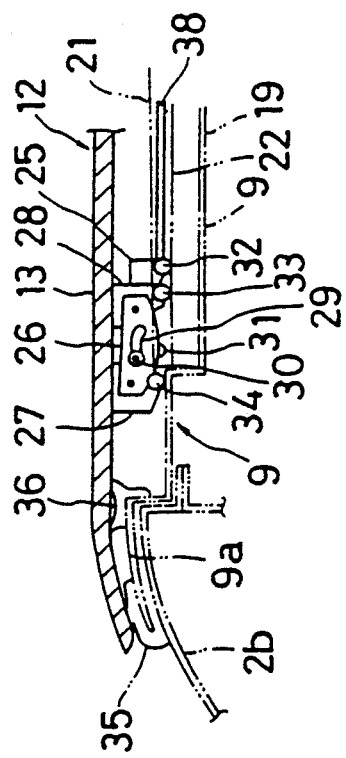
Figure 11B:
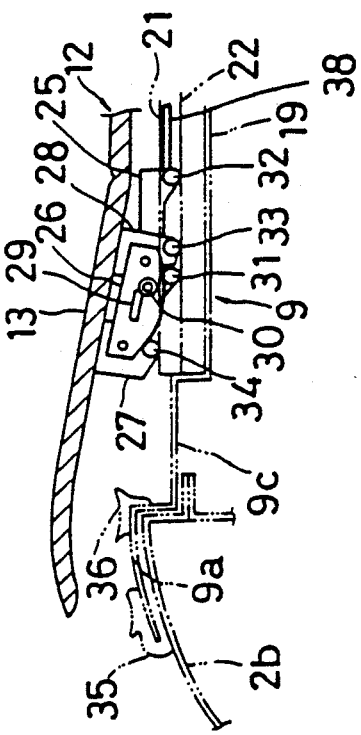

Referring now to FIGS. 11(a) and 11(b), a connecting jig 25 is mounted through a bracket 26 on a lower surface of the front hard portion 13 to connect with a forward end of the drive wire 38 inserted in the upper guide groove 22. The bracket 26 is fixed to the front hard portion 13 by a pair of fixing members 27 and 28 and forms a guide groove 29 which extends in a longitudinal direction of the vehicle body and a rear end portion of which is inclined downwardly. The connecting jig 25 is movably engaged with the guide groove 29 through a pin 30. The connecting jig 25 is provided at its forward and rearward ends with projecting engagement pins 31 and 32, respectively, engaged with the rail portion 24 of the guide rail 21. The fixing member 28 on the rear side is provided with a projecting engagement pin 33 while the fixing member 28 on the forward side is provided with a projecting engagement pin 34 which is engageable with an upper portion of the guide rail 21 when the top 12 is operated to open, on the one hand, and which becomes located on the inward flange portion 9c upon disconnection from a forward end of the guide rail 21 when the top 12 is closed, on the other hand. More specifically, in this embodiment, as shown in FIG. 11(a), when the top 12 is closed, the location of the engagement pin 34 on the inward flange portion 9c, when disconnected from the forward end of the guide rail 21, embodies a state in which the forward end of the front hard portion 13 is abuttable with the outward flange portion 9a located on the front header 2b. At this time, the pin 30 of the connecting jig 25 is engaged with a horizontal forward end portion of the guide groove 29. As shown in FIG. 11(b), when the top 12 is operated to open, as the connecting jig 25 is transferred rearwardly by a pulling force of the drive wire 38, the engagement pin 34 is brought into engagement with an upper portion of the guide rail 21 to thereby incline a forward end of the front hard portion 13 upwardly. This reduces the sliding resistance upon operation to open the top 12. At this time, the pin 30 of the connecting jig 25 is engaged with a downwardly inclining portion on the rearward end side of the guide groove 29.

Figure 12:
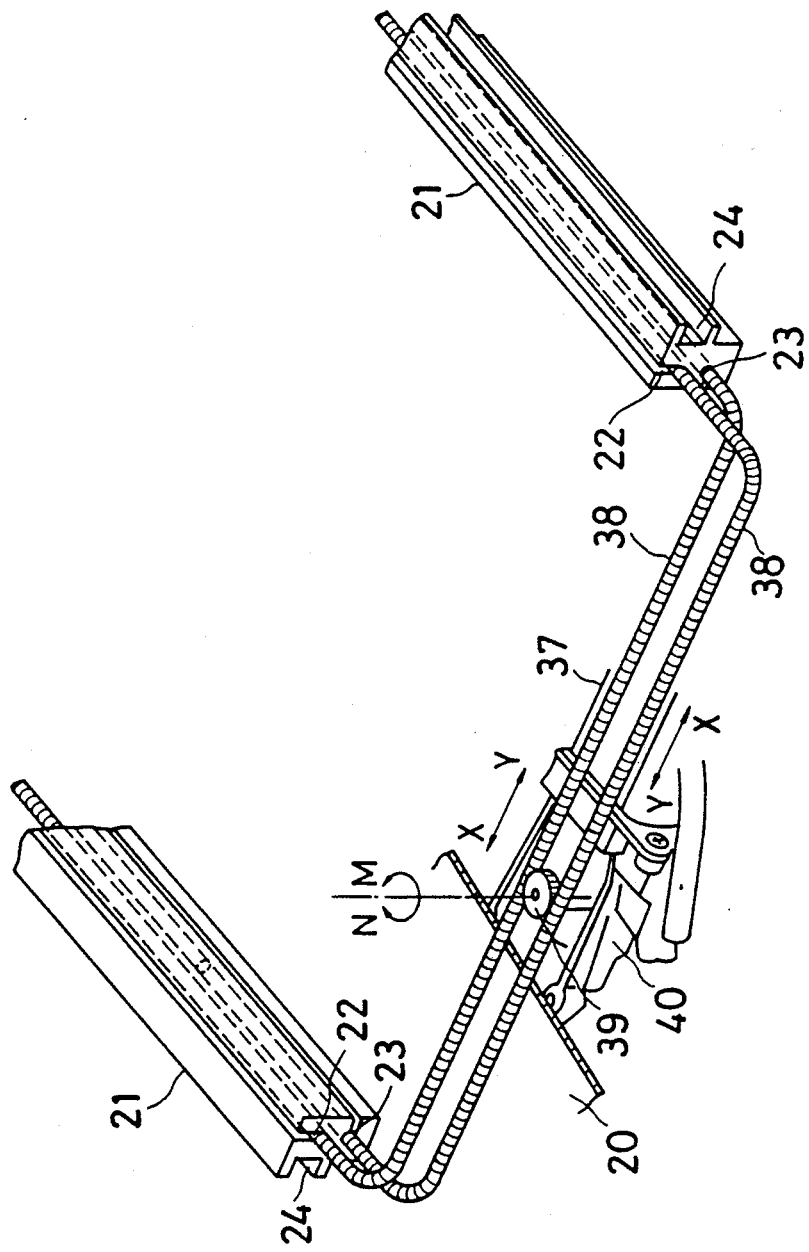

As shown again in FIG. 6, the drive means 37 comprises a pair of drive wires 38 and 38 connecting the connecting jigs 25 and 25 mounted on both sides of the front hard portion 13, a gear 39 disposed in the communication groove 20 and engageable with the drive wires 38 and 38, and a reversible motor 40 mounted on a lower surface side of the communication groove 20 for reversibly rotating the gear 39. In the drawing, reference numeral 42 denotes a covering member for covering an upper portion of the communication groove 20 disposed on the base frame 9. Each of the drive wires 38 is connected to the connecting jig 25 disposed in the upper guide groove 22 of the guide rail 21 on one side and is disposed to extend rearwardly in the upper guide groove 22 so as to be communicated through the communication groove 20 with the inside of the lower guide groove 23 of the guide rail 21 on another side. Each of the drive wires 38 is further provided on its outer circumference with a toothed form to mesh with the gear 39 and is designed so as to be relatively movable in both directions as indicated by the arrow X or by the arrow Y upon rotation of the gear 39, as shown in FIG. 12. In other words, when the reversible motor 40 is rotated in a normal rotational direction, i.e., in the direction as indicated by the arrow M in FIG. 12, on the one hand, the drive wires 38 and 38 are relatively transferred in the direction as indicated by the arrow X in FIG. 12 in order to operate to open the top 12 by a normal rotation of the gear 39. When the reversible motor 40 is rotated in a reverse rotational direction, i.e., in the direction as indicated by the arrow N in FIG. 12, on the other hand, the drive wires 38 and 38 are relatively transferred in the direction as indicated by the arrow Y in FIG. 12 in order to be operated to close the top 12 by a reverse rotation of the gear 39, i.e., by rotating the gear 39 in a reverse direction.

Figure 13A:
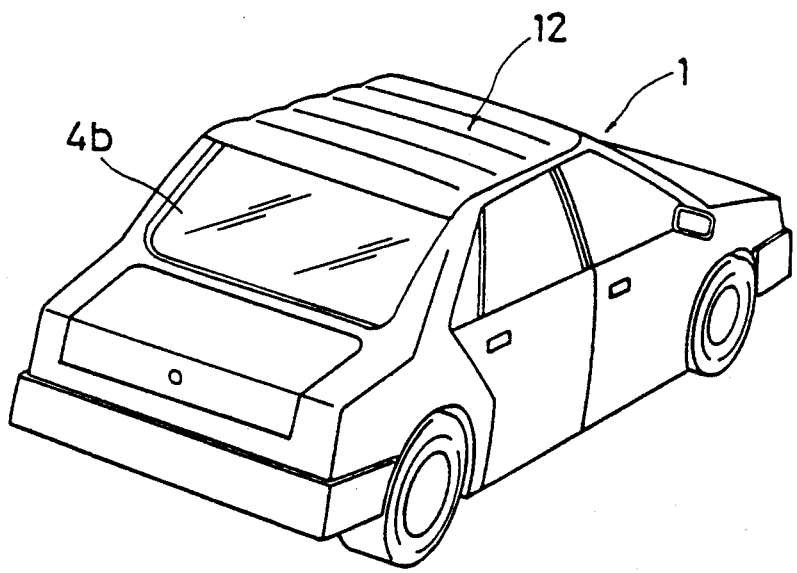

As shown in FIGS. 1 and 13(a), when the top 12 is used in an ordinary state, the top 12 is in such a state that it closes the roof panel opening 3 of the roof panel 2—in this embodiment, the opening 10 on the roof side of the base frame 9. In other words, the top 12 is referred to in this specification as being located at a first posture which covers the roof panel opening 3. At the first posture, the top 12 is maintained in a closed state by a force pushing forwardly the front hard portion 13 by the drive means 37 and by a force regulating a forward movement of the top 12, such a force being created by the engagement of the rearward projection 64 mounted on the rear hard portion 14 with the engagement piece 66 projecting from the side of the base frame 9.

The top 12 at the first posture is operated to open by the following procedures.

Figure 13B:
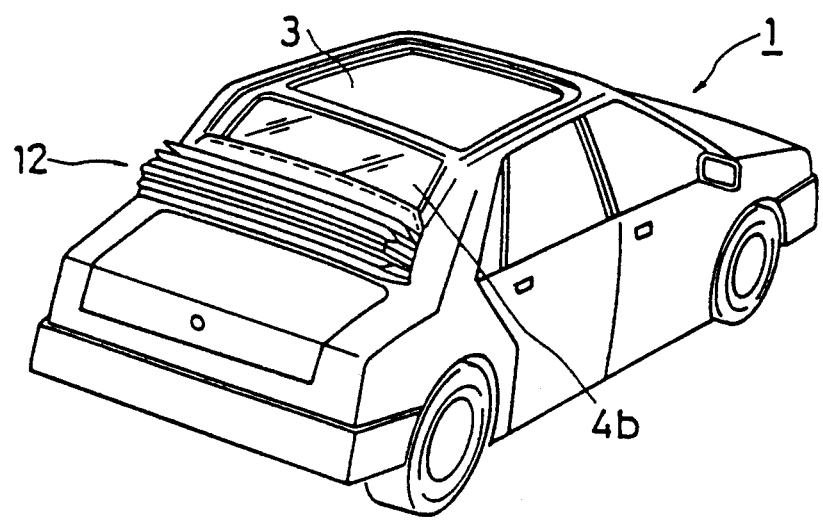
FIG. 13(b) shows the top at its second posture, or in an open state.

As the reversible motor 40 constituting the drive means 37 is rotated in its normal rotational direction, the drive wires 38 and 38 are relatively transferred toward the direction as indicated by the arrow X in FIG. 12. This relative transferral of the drive wires 38 and 38 forces the front hard portion 13 of the top 12 connected through the connecting jigs 25 and 25 to forward ends of the drive wires 38 and 38 to be pulled rearwardly by the urging force of an urging means 65, thus folding the top 12 at a position where the urging means 65 is released to a free state, as shown by the dotted line in FIG. 10. Thereafter, the top 12 is guided downwardly by the guide rails 21 and 21 and then housed in a folded state at a position to the rear of and below the windshield glass panel, as shown in FIG. 13(b) and by the dotted line in FIG. 1. The lower end position of the windshield portion at which the top 12 is housed is referred to in this specification briefly as a second posture. In the second posture, the roof panel opening 3 of the roof panel 2—in this embodiment, the opening 10 on the roof side of the base frame 9—is in a state in which it is thoroughly open, providing a full open air feeling to the passengers. In the state in which the top 12 is located at the second posture, the top 12 does not increase air resistance during vehicle motion so that this arrangement is advantageous from the viewpoint of air resistance.

Operation for closure of the top 12 is carried out by rotation of the reversible motor 40 in a reversely rotational direction to relatively transfer the drive wires 38 and 38 in the direction indicated by the arrow Y in FIG. 12. This relative movement of the drive wires 38 and 38 forces the front hard portion 13 of the top 12 connected to the forward ends of the drive wires 38 and 38 through the connecting jigs 25 and 25 to be pushed forwardly and transfers the top 12 guided by the guide rails 21 and 21 to a position where the rearward projection 64 mounted on the rear hard portion 14 is engaged with the engagement piece 66 on the side of the base frame 9. The top 12 is then moved against the urging force of the urging means 65 until the front hard portion 13 is located at a forward edge of the opening 10 on the roof side of the base frame 9, whereby the top 12 is located at the first posture at which it is disposed so as to close the opening portion 3 of the roof panel 2, namely, the opening 10 on the roof side of the base frame 9, as shown by the solid line in FIG. 1 and in FIG. 13(a).

Second Embodiment

FIGS. 14 to 18 are directed to the second embodiment of the structure of a flexible top for a vehicle in accordance with the present invention. In this embodiment, the identical elements are provided with the same reference numerals, so a duplicate description on these elements will be omitted from the following description for brevity.

Figure 15:
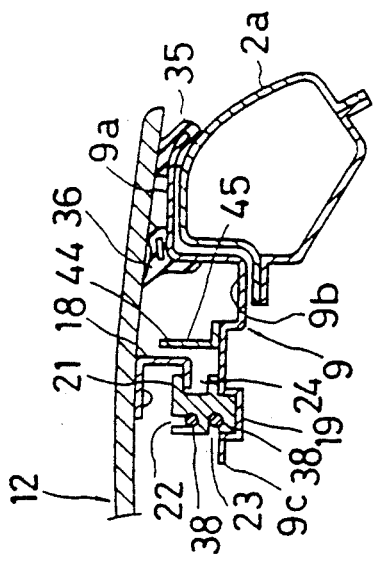
Figure 14:
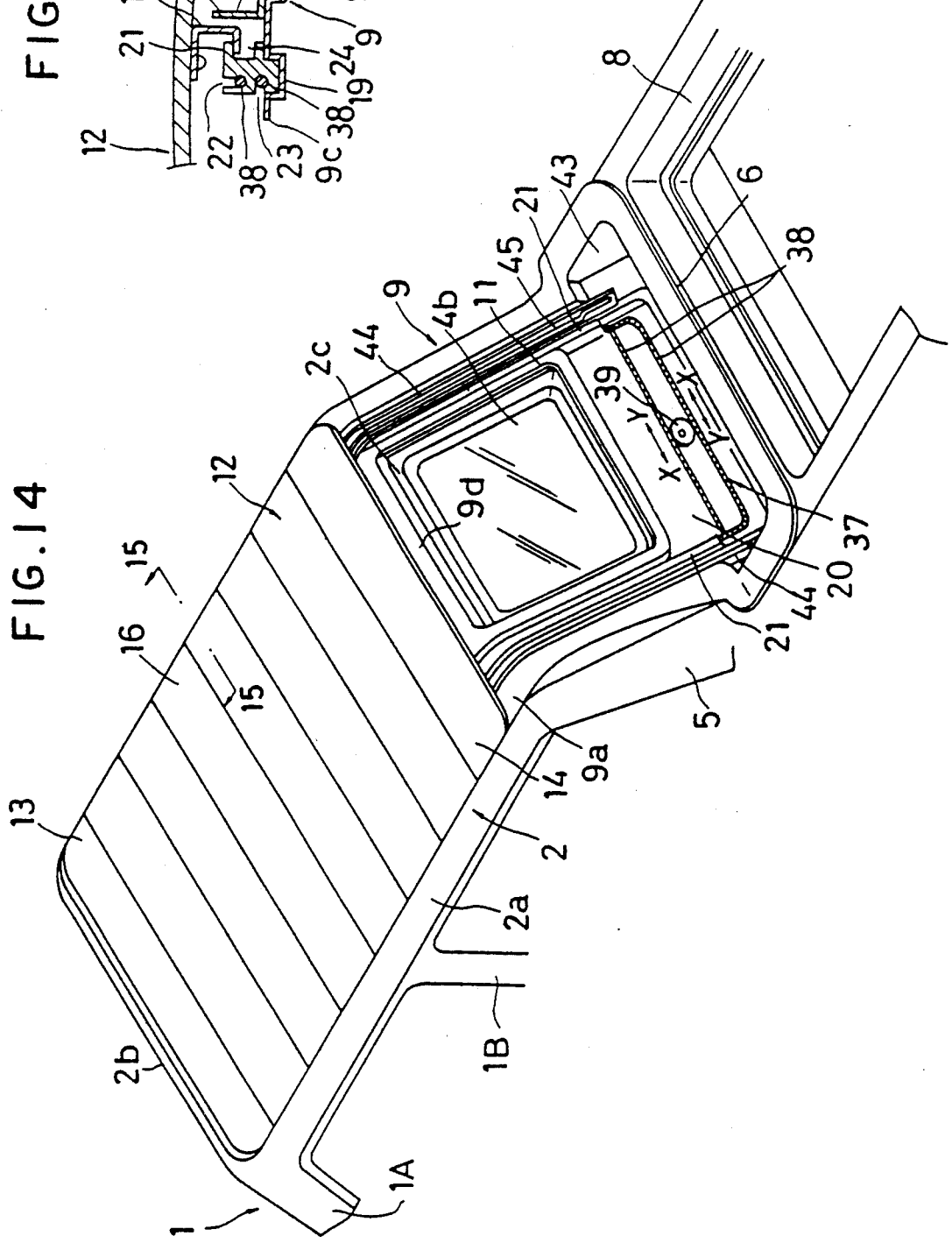
Figure 18:
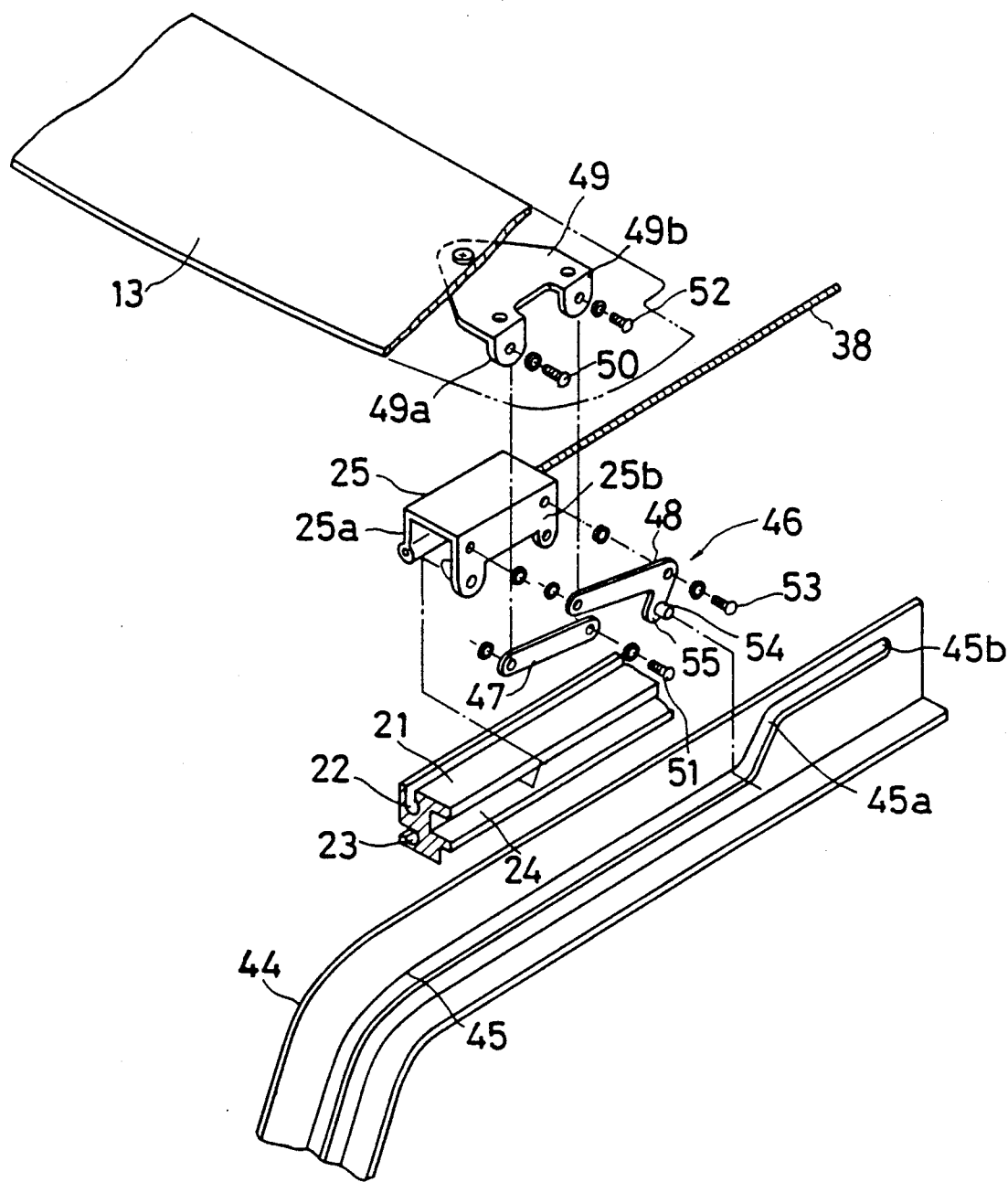

Referring to FIGS. 14, 16 and 17, a top housing chamber 43 is disposed at a position rearward of the windshield glass panel and near a lower end portion of the glass panel in the vehicle body 1, which is disposed extending from the base frame 9 and is large enough to accommodate the top 12 in a folded state. The guide rails 21 and 21 extend to both sides of the top housing chamber 43. As shown in FIGS. 15 and 18, the inward flange portion 9c of the base frame 9 is provided with a link-guiding guide rails 44 and 44 extending in parallel to each other outward of the guide rails 21 and 21. Each of the link-guiding guide rails 44 is provided with a guide groove 45 for guiding a link member (will be described hereinbelow) interposed between the front hard portion 13 of the top 12 and the connecting jig 25 connected to a forward end of the drive wire 38. As shown specifically in FIGS. 17 and 18, the guide groove 45 extends in a longitudinal direction of the vehicle body and at its rearward portion toward a higher guide portion be through an inclination portion 45a. In this embodiment, as shown in FIG. 18, the connecting jig 25 connected to the forward end of the drive wire 38 is in a downwardly open, squared C-shaped form. An inward side piece portion 25a of the connecting jig 25 is connected to the forward end of the drive wire 38 in the upper guide groove 22 of the guide rail 21 while an outward side piece portion 25b thereof is provided at forward and rearward portions of its lower end with projecting engagement pins 31 and 32, respectively, which project inwardly and engage with the rail portion 24 of the guide rail 21. Between the front hard portion 13 of the top 12 and the outward side piece portion 25b of the connecting jig 25 is interposed a link mechanism 46 comprising first and second links 47 and 48 parallel to each other. As shown in FIG. 17, the link mechanism 46 changes the postures of the front hard portion 13 from a posture parallel to the rear pillar 5 (in other words, the windshield glass panel 4b)—namely, from a posture of movement at the time of operation to open the top 12—to a horizontal posture in which the front hard portion 13 covers a upper portion of the top housing chamber 43, as shown by the dotted line in FIG. 17, when the top 12 is being housed. The first link 47 is pivotably supported on both sides by a forward support section 49a of a support jig 49 fixed to the front hard portion 13 through a support pin 50 and by the connecting jig 25 through a support pin 51, while the second link 48 is pivotably supported on both sides by a rearward support section 49b of the support jig 49 fixed to the front hard portion 13 through a support pin 52 and by the connecting jig 25 at a position rearward of a support point of the first link 47 through a support pin 53, respectively. The second link 48 is integrally provided forwardly at its support end portion on the side of the connecting jig 25 with an extension portion 55 which is provided a projecting engagement pin 54 engageable with the guide groove 45 of the link-guiding guide rail 44. More specifically, when the top 12 is operated to be opened or closed, the front hard portion 13 of the top 12 is transferred rearwardly or forwardly, while maintaining its posture substantially in parallel to the guide rail 21 in a state in which the engagement pin 54 projects from the extension portion 55 of the second link 48, as the connecting jig 25 is moved in a rearward direction or in a forward direction along the guide rail 21 by means of a pulling or pushing force by the drive wire 38. Furthermore, as shown in FIGS. 17 and 18, when the top 12 is housed in the top housing chamber 43 in a folded state, as the engagement pin 54 projecting from the extension portion 55 of the second link 48 is transferred toward the higher guide portion 45b after guidance on the inclination portion 45a at the rearward end portion of the guide groove 45, the second link 48 is pivoted about the support pin 53 in the direction indicated by the arrow P in FIG. 17. As the second link 48 is pivoted, the first link 47 is pivoted about the support pin 51 in the direction indicated by the arrow Q in FIG. 17. As a result, the front hard portion 13 of the top 12 takes a posture so as to cover the upper portion of the top housing chamber 43 and is turned to a position where it is in substantially the same surface position as would be a trunk lid 56 covering an upper portion of the top housing chamber 43. Thus, in this embodiment, the top 12 can be completely housed within the top housing chamber 43 located below the windshield glass panel 4b on the rearward side. And during housing, no rear vision through the windshield glass panel 4b is blocked. Furthermore, this structure in the second embodiment ensures a flush surface on a rearward portion of the vehicle body.

It is to be noted that the other structures and functions of this second embodiment are substantially the same as in the first embodiment as have been described hereinabove, so a description of such is omitted.

Third Embodiment

FIGS. 19 to 26 are directed to the third embodiment of the structure of a flexible top according to the present invention. The same elements are provided with the same reference numerals as in the first and second embodiments. A description of such elements will be omitted for brevity.

In this embodiment, the top 12 capable of covering or uncovering the opening portion 13 of the roof panel 12 is wound on a winding rod 57 disposed at a position to the rear of and below the windshield glass panel 4b while the top 12 is housed.

The winding rod 57 is rotatably supported by bearings 58 and 58 projecting from the sides of the rearward end portion of the outward flange portion 9a of the base frame 9 and is urged by an appropriate means (not shown) in the direction in which the top 12 is wound. To the winding rod 57 is windably fixed end portions of connecting belts 59 and 59 connected to both side ends of an end portion of the top 12. Thus, in this embodiment, when the top 12 is closed, a rearward end portion of the top 12 is pulled rearwardly and constantly by the winding force of the winding rod 57, so that no stopper mechanism as provided in the first and second embodiments is required in order to regulate the movement of the rearward end portion of the top 12.

In this embodiment, the top 12 differs from those used in the first and second embodiments hereinabove and comprises a front hard portion 13 and a leather top portion 16. It is to be noted that, unlike those used in the first and second embodiments, the leather top portion 16 is not provided with any spring between the skeleton members to be mounted thereon, thereby making the top 12 flexible so that it can be wound on the winding rod 57.

Figure 22:
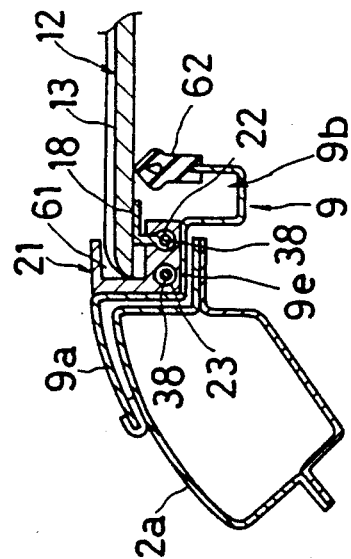
FIG. 22 is a cross-sectional view taken along the line 22—22 of FIG. 19.
Figure 21:
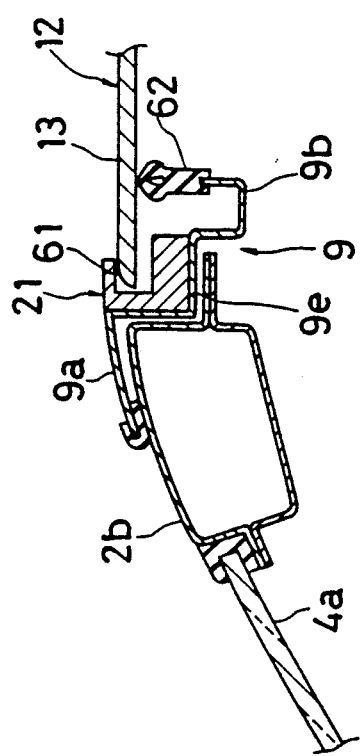
FIG. 21 is a cross-sectional view taken along the line 21—21 of FIG. 19.
Figure 25:
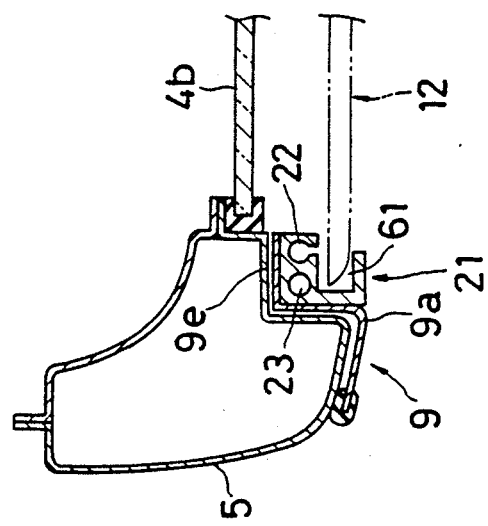
FIG. 25 is a cross-sectional view taken along the line 25—25 of FIG. 19.
Figure 24:
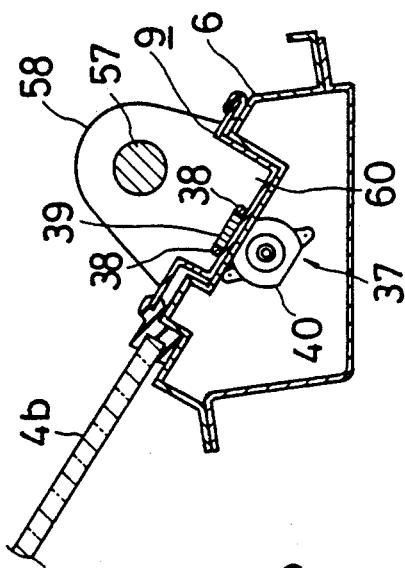
FIG. 24 is a cross-sectional view taken along the line 24—24 of FIG. 19.
Figure 23:
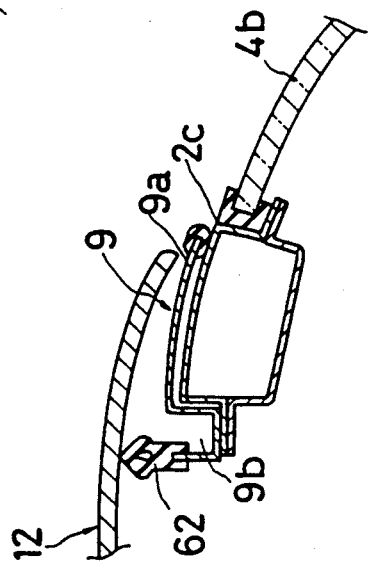
FIG. 23 is a cross-sectional view taken along the line 23—23 of FIG. 19.

In this embodiment, as shown in FIGS. 20, 21, 22 and 25, unlike the base frame 9 used in the first and second embodiments, the base frame 9 is provided with a stair portion 94 which mounts the guide rail 21 on an inner edge of the outward flange portion 9a in abutment with the roof side rails 2a, 2a of the roof panel 2, the front header 2b, the rear pillars 5, 5, and the rear deck 6. On an inner edge of the stair portion 9e and a forward edge of a partition portion 9d is provided the rain rail portion 9b. At a rearward end portion of the stair portion 9e is provided a concave portion 60 for the disposition of the drive wires 38 and 38 and the gear 39 constituting the drive means 37. The guide rail 21 extends over the full length from a forward side to both left-hand and right-hand sides in the stair portion 9e and is provided with a guide portion 61 in a squared C-shaped form in cross section for guiding a peripheral edge portion of the top 12. In this embodiment, as shown in FIGS. 22 and 25, the guide rail 21 is provided with guide grooves 22 and 23 for receiving the inserted drive wires 38 and 38, respectively, guide grooves being disposed side by side at inside and outside positions. In this embodiment, the gap between the top 12 and the base frame 9 is sealed by a seal member 62 mounted on an inner edge of the rain rail portion 9b.

The other structures and functions of this embodiment are substantially the same as those of the first and second embodiments, and a description on them is accordingly omitted from this specification for brevity.

Figure 19:
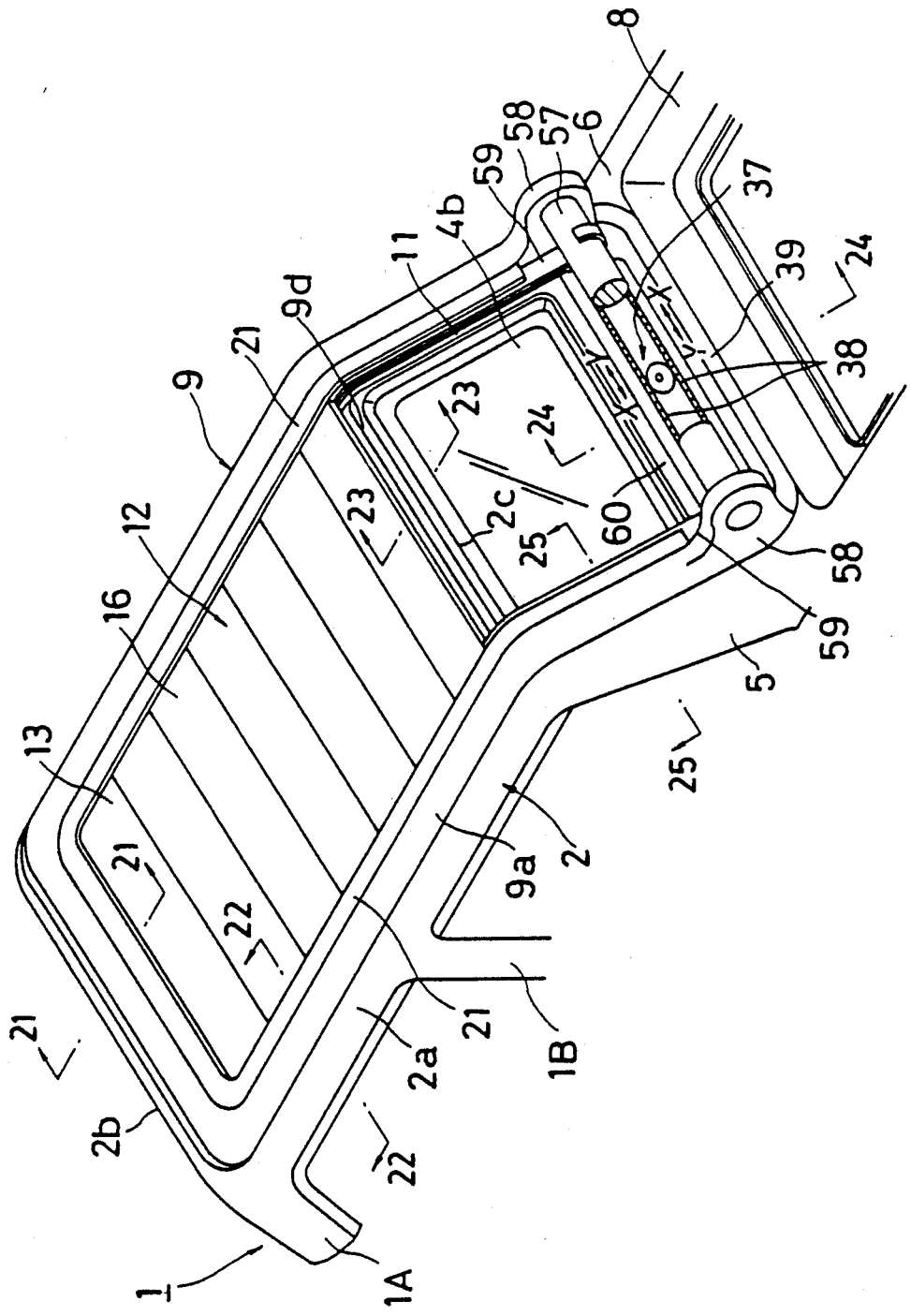
FIG. 19 is a perspective view corresponding to FIG. 1.
Figure 20:
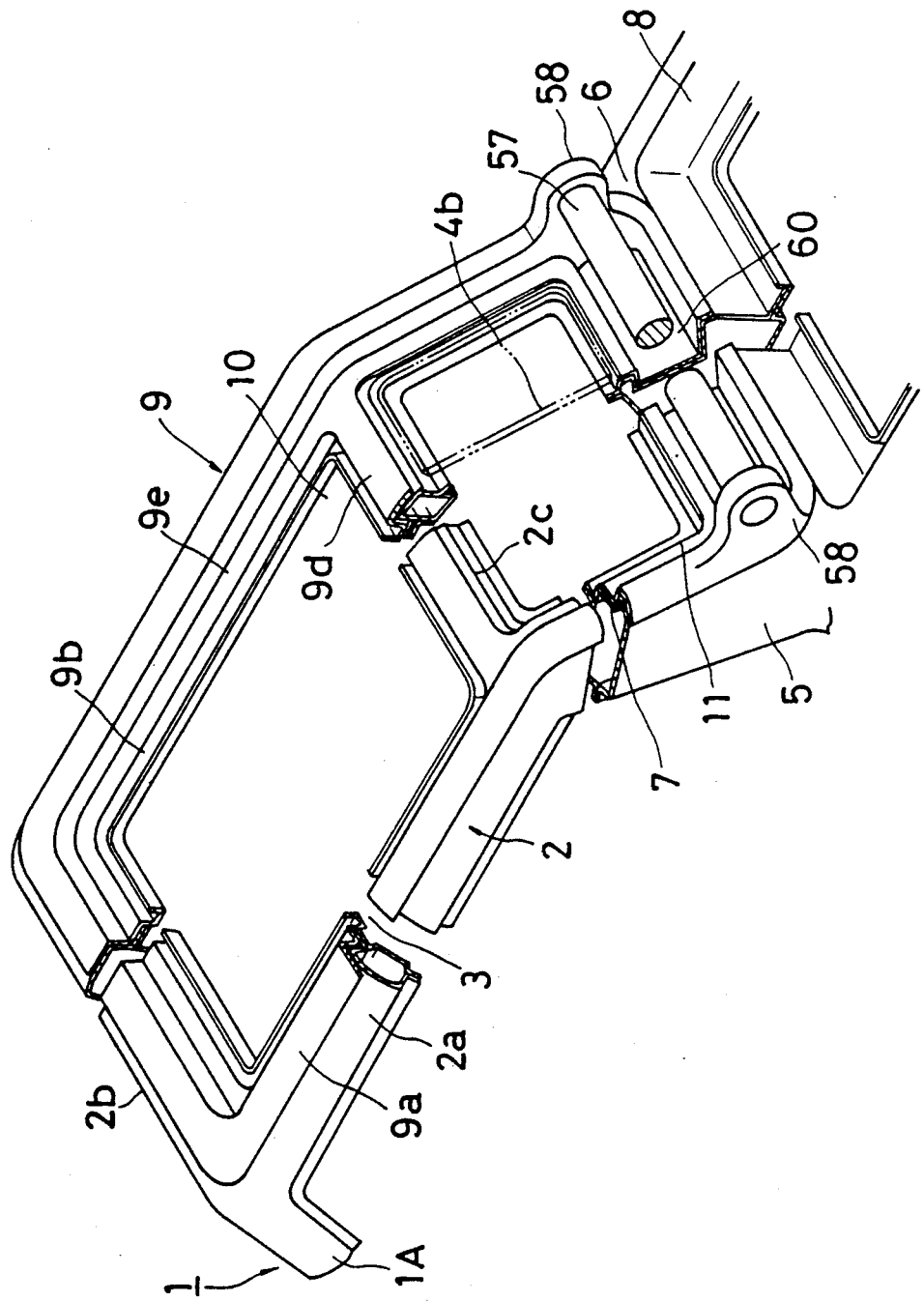
FIG. 20 is a perspective view corresponding to FIG. 2.

In this third embodiment, as shown in FIG. 19, when the top 12 is disposed to cover the roof panel opening 3 of the roof panel 2, the top 12 takes the first posture at which the opening portion 3 of the roof panel 2 is covered with the top 12. At this first posture, the top 12 is maintained in a state in which it covers the roof panel opening 3 by means of a forward force to be applied to the front hard portion 13 through the drive wires 38 and 38 and by means of a rearward force to be applied to the rearward end of the leather top portion 16 through connecting belts 59 and 59 by the winding force of the winding rod 57.

Figure 26:
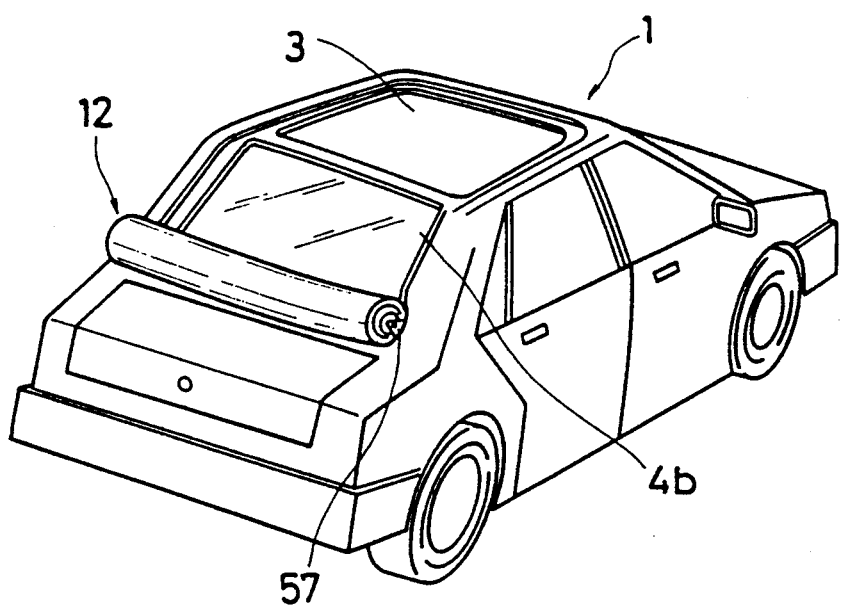
FIG. 26 is a perspective view corresponding to FIG. 13(b)

The reversible motor 40 constituting the drive means 37 is driven in a normal rotational direction and relatively moves the drive wires 38 and 38 in the direction indicated by the arrow X in FIG. 19 by means of the rotation of the gear 39. This movement forces the front hard portion 13 of the top 12 connected to the forward ends of the drive wires 38 and 38 to be pulled rearwardly through the connecting jigs 25 and 25, whereby the top 12 is wound from the rearward end portion gradually on the winding rod 57 by the connecting belts 59 and 59 while being guided by the guide rails 21 and 21. More specifically, the top 12 takes the second posture at which it is housed at a position to the rear of and below the windshield glass panel 4b, as shown in FIG. 26. At this second posture, the roof panel opening 3 is in a fully open state—in this embodiment, the opening 10 of the base frame 9 on the roof side—thus providing passengers with an open air feeling. In this posture, the top 12 is fully housed at a position nearby a lower end portion of the windshield glass panel 4b so that there is little risk of increasing air resistance during motion, thus presenting an advantage in air resistance.

The top 12 is closed by rotating the reversible motor 40 in a reverse direction and, as a result, relatively moving the drive wires 38 and 38 in the direction indicated by the arrow Y in FIG. 19 by a reverse rotation of the gear 39. This movement pushes forwardly the front hard portion 13 of the top 12 connected to forward ends of the drive wires 38 and 38 through the connecting jigs 25 and 25, and the top 12 is then caused to be moved to a position at which the connecting belts 59 and 59 are completely rewound while being guided by the guide rails 21 and 21 until it takes the first posture at which it covers the roof panel opening 3, i.e., the opening 10 of the base frame 9 on the roof side.

In each of the above embodiments, the base frame 9 may be mounted as a separate piece on an upper portion of the vehicle body 1 or the base frame for the flexible top may be integrally formed with the vehicle body 1.

Fourth Embodiment

FIGS. 27 to 35 are directed to the fourth embodiment of the structure of a flexible top for a vehicle in accordance with the present invention, which involves housing the top 12 in a trunk room. In this embodiment, the identical elements are provided with the same reference numerals, so a duplicate description on these elements will be omitted from the following description for brevity.

Figure 27:
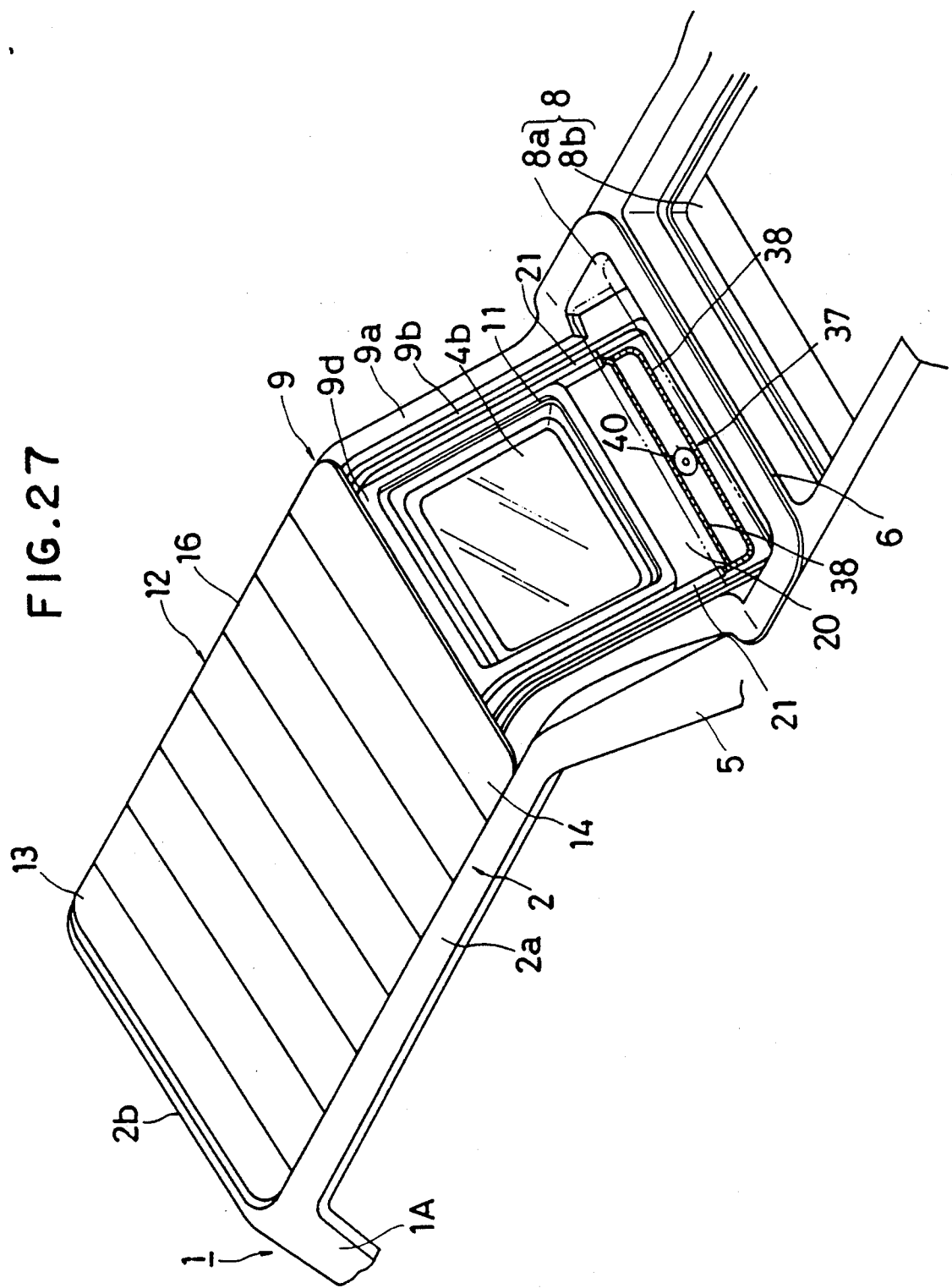
Figure 28:
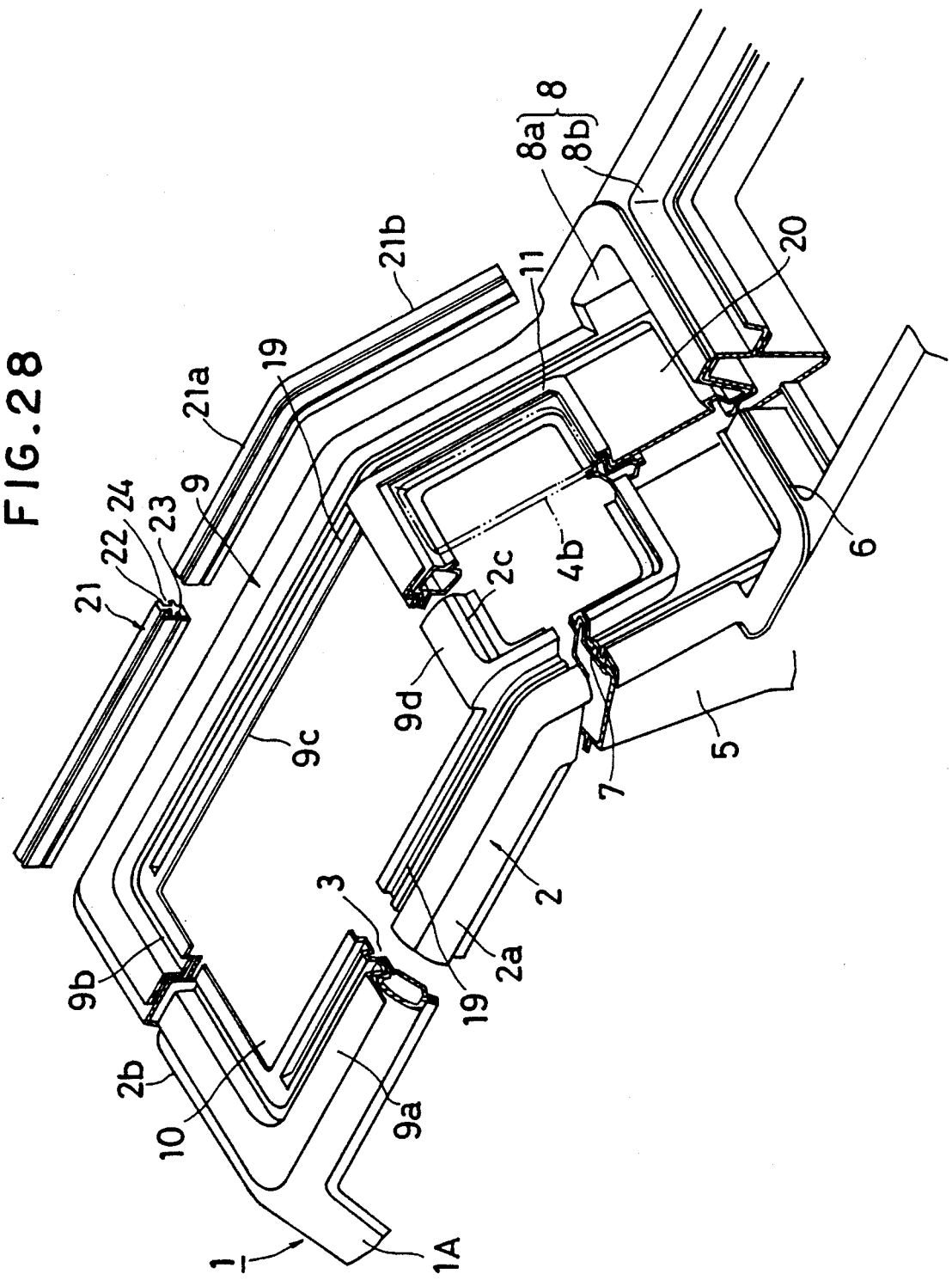
Figure 29:
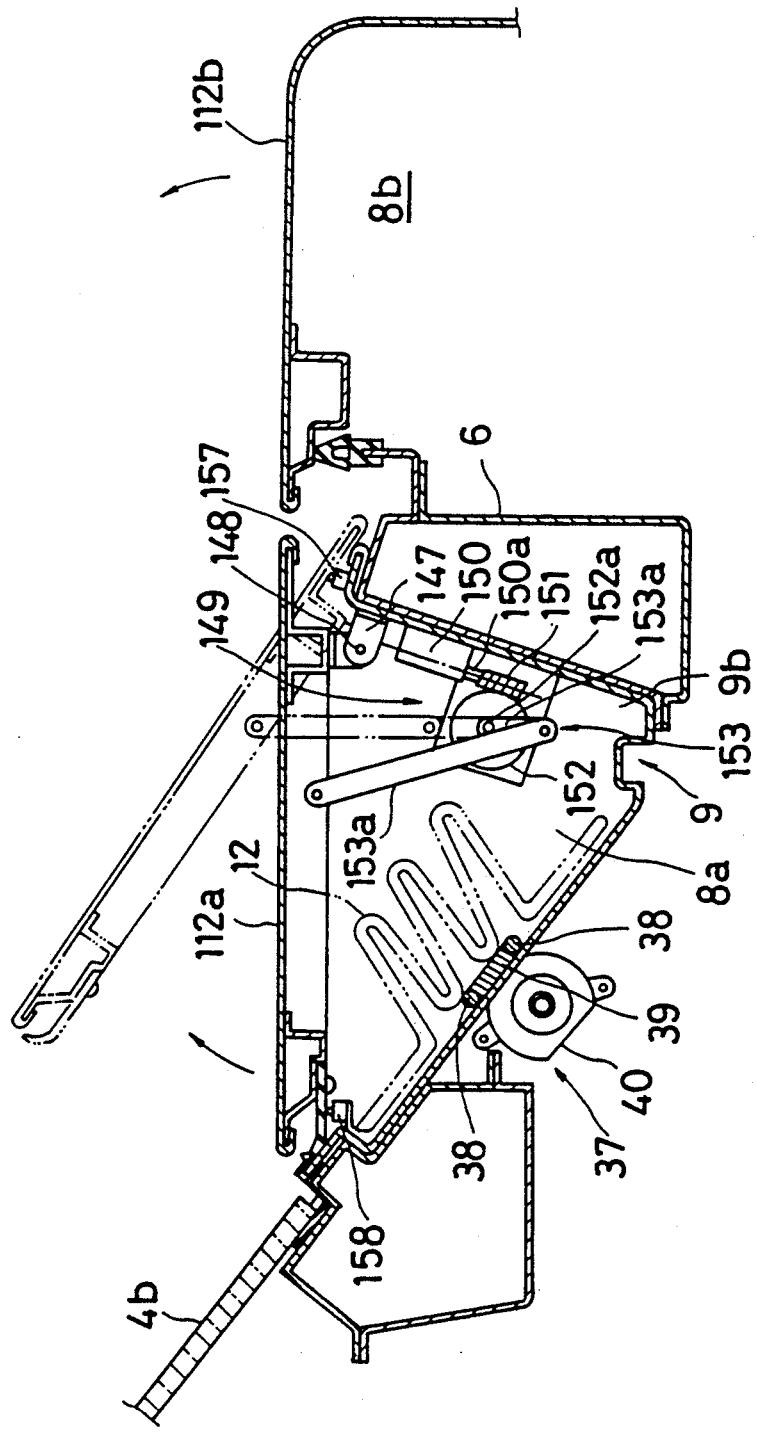

As shown in FIGS. 27 to 29, the base frame 29 is provided at its rearward end portion with a subsidiary room 8a large enough to house the top 12 in a folded state. The subsidiary room 8a forms a trunk room 8 in association with a main room 8b disposed at a position rearward of the subsidiary room 8a and divided therefrom by the rear deck 6. Alternatively, the trunk room 8 may be of a one-room construction in which the top 12 is housed in its forward portion. In either case, the top 12 may be of substantially the same construction as in FIGS. 9 and 10. As shown in FIG. 29, an upper opening of the trunk room 8 is opened or closed by a lid 112 which, in this embodiment, comprises a subsidiary lid 112a which is disposed on the side of an upper opening of the subsidiary room 8a and which can be opened in front or opened from the forward portion, and a main lid 112b which is disposed on the side of an upper opening of the main room 8b. In an alternative case, the upper openings of both the subsidiary room 8a and the main room 8b can be covered so as to be opened or closed at the rear by one lid which opens from the rearward position.

Figure 33:
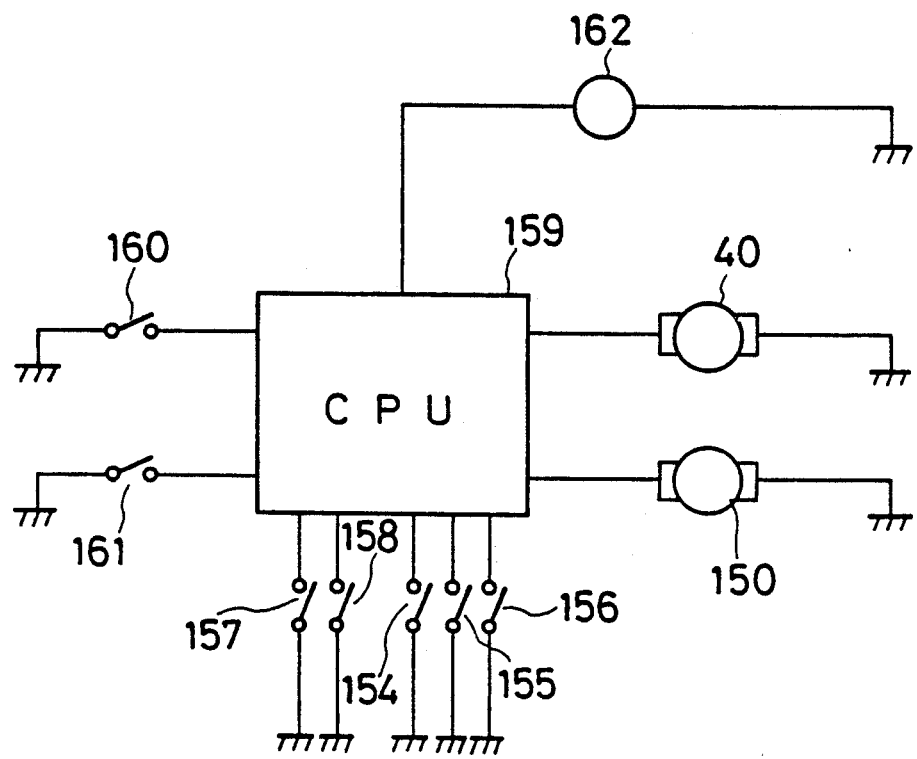

Referring to FIG. 31, the guide rail 21 is provided with three limit switches 154, 155 and 156 operable to turn on upon a contact of the guide piece 18 to be guided on the rail portion 24 with the connecting jig 25. More particularly, the guide rail 21 is provided at its forward end portion with the first limit switch 154, at its intermediate portion with the second limit switch 155, and at its rearward end portion with the third limit switch 156. The first limit switch 154 is turned on as the top 12 is brought into contact with the connecting jig 25 disposed on a lower surface of the front hard portion 13 of the top 12 in such a state that the opening 10 on the roof side is covered by the top 12. The second and third limit switches 155 and 156, respectively, are turned on upon a contact with the guide piece 18 disposed on a lower surface of the rear hard portion 14 of the top 12 in such a state that the top 12 is just about to be housed or that an accommodation of the top 12 has been finished. Referring to FIG. 33, ON signals from the limit switches 154, 155 and 156 are input to a microcomputer 159 functioning as a control means as will be described below.

Figure 30:
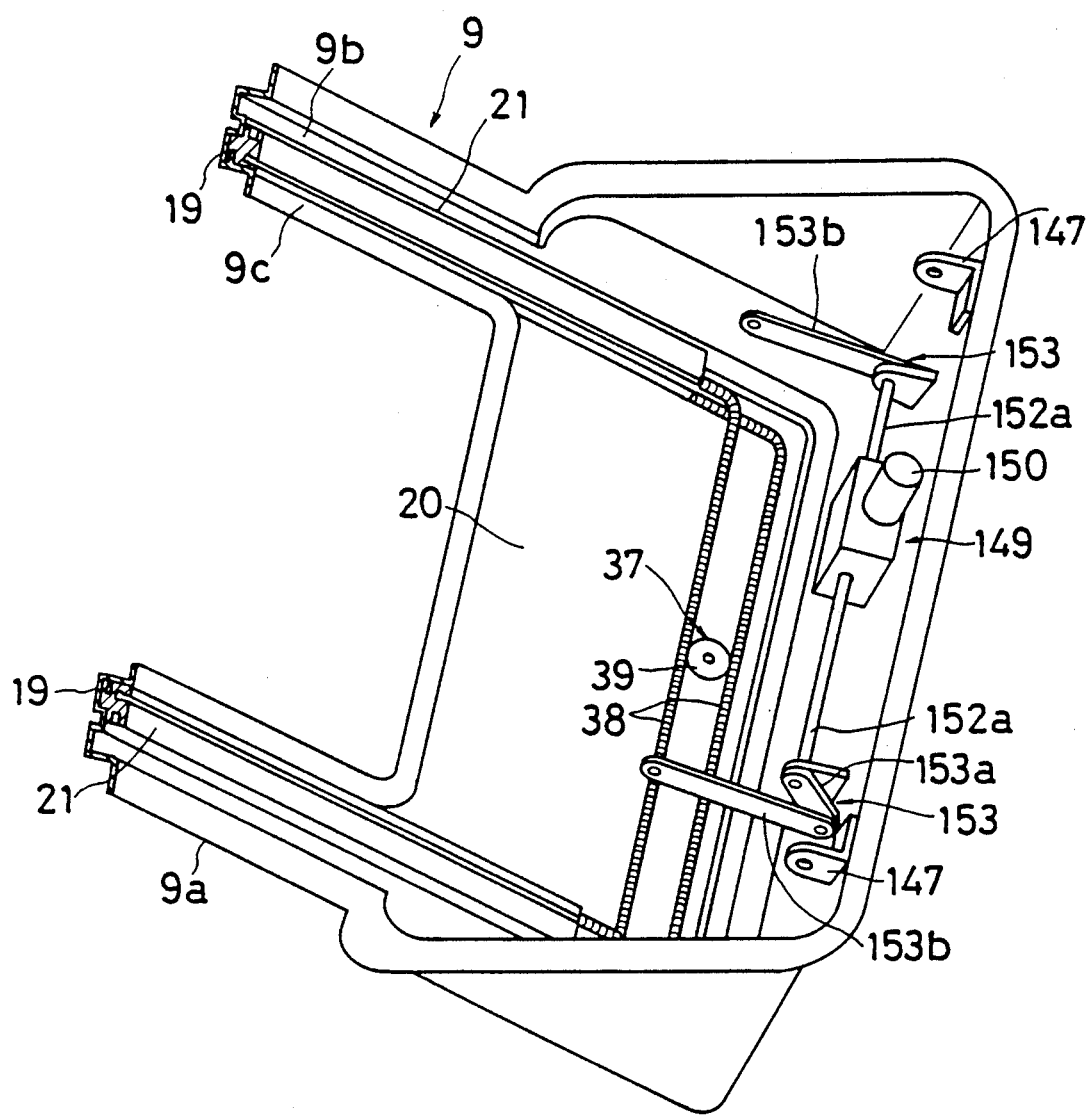

In this embodiment, as shown in FIGS. 29 and 30, the subsidiary lid 112a covering or uncovering the upper opening of the subsidiary room 8a is pivotably supported on brackets 147 and 147 fixed on upper end portions of the rear deck 6 through shafts 1 148 and 148, respectively, so as to be opened or closed by a drive means 149 for opening or closing the lid 8. The drive means 149 comprises a motor 150 for opening or closing the lid, a worm gear 151 mounted on a rotary shaft 150 of the motor 150, a bevel gear 152 meshing with the worm gear 151, and link mechanisms 153 and 153 connected pivotably to both sides of the bevel gear 152. Each of the link mechanisms 153 comprises a first link section 153a connected to an end portion of the rotary shaft 152a of the bevel gear 152, and a second link section 153b for connecting a side portion of the first link section 153a to a lower surface of the subsidiary lid 112a. Thus the bevel gear 152, as it rotates upon the driving of the motor 50, displaces the link mechanism 153 from a state as shown by the solid line to a state as shown by the dotted line in FIG. 29, whereby the subsidiary lid 112a is opened in a rearward direction, as shown by the solid and dotted lines on the drawing. On an opening edge of the upper opening of the subsidiary room 8a are mounted a fourth limit switch 157 capable of being turned on upon contact with a rearward edge of the subsidiary lid 112a when the subsidiary lid 112a is opened and a fifth limit switch 158 capable of being turned on upon contact with a forward edge thereof when it is closed. ON signals from these limit switches 157 and 158 are also input to the microcomputer 159 serving as the control means as will be described more in detail hereinbelow, as shown in FIG. 33.

The microcomputer 159 is provided with the ON signals from the limit switches 154, 155, 156, 157, and 158 and ON signals from a top opening switch 160 for generating an instruction for the operation of opening the top 12 and from a top closing switch 161 for generating an instruction for the operation of closing the top 12. The microcomputer 159 comprises the reversible motor 40 having the drive means 37 for driving the opening or closing of the top, and the lid-opening/closing motor 150 having the drive means 37 for opening or closing the lid. It also enables control over operation of an alarm buzzer for generating an alarm at the time when the top 12 is closed.

More particularly, in this embodiment the microcomputer 159 controls the driving of the drive means 37 for opening or closing the top, i.e., the reversible motor 40, and the drive means 149 for opening or closing the lid, i.e., the motor 150 for opening or closing the lid, in such a manner that the subsidiary lid 112a is opened at the time of a movement from a state of operation of housing the top 12 or from a state of housing or accommodation to a state in which the top 12 covers the roof panel opening and that the subsidiary lid 112a is operated to be closed at the time when the top 12 is housed or accommodated or when the top 12 is being used and, furthermore, to control generating or suspending the alarm buzzer 162. 1

Figure 34:
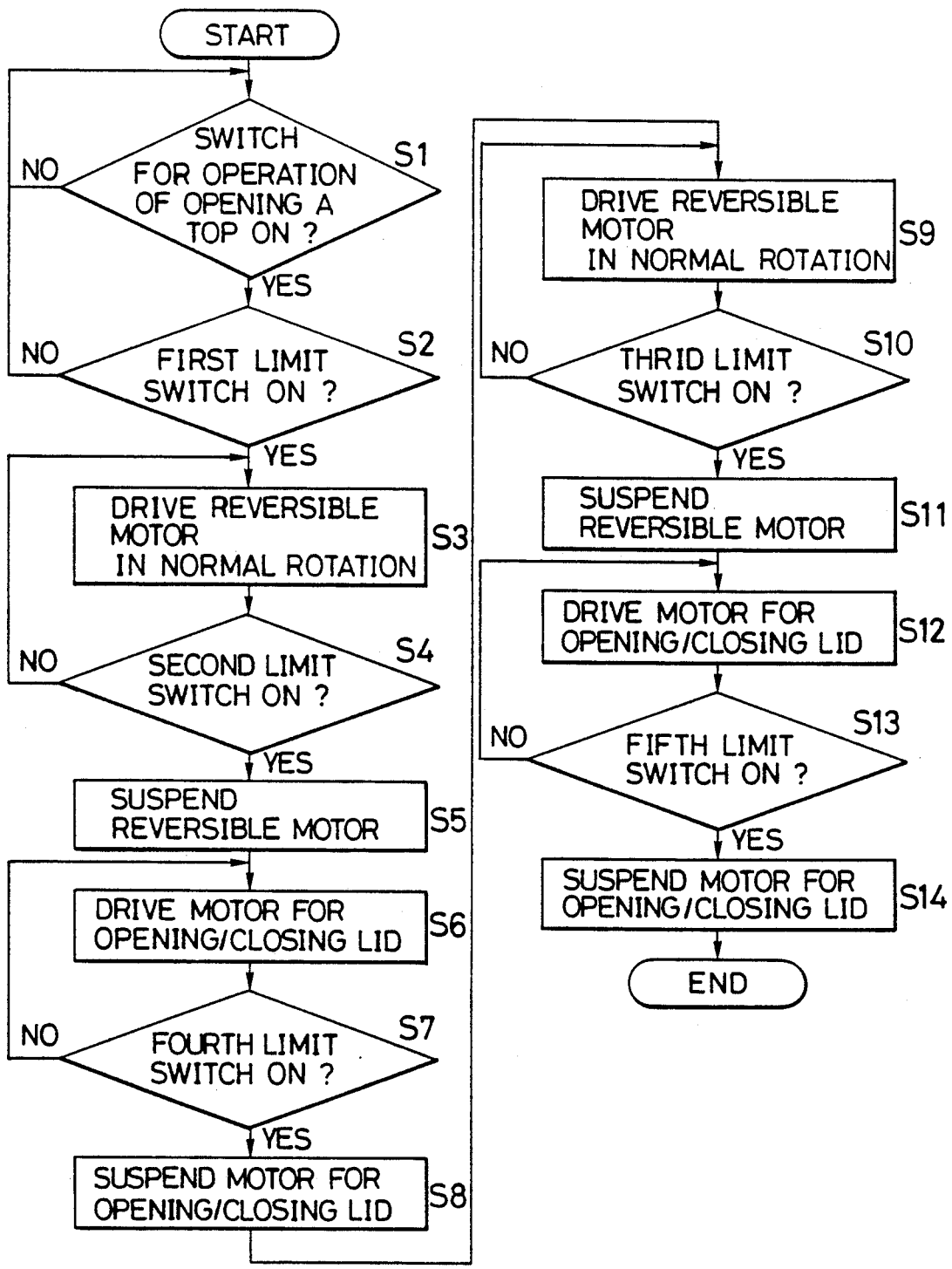

The action of the flexible top according to the present invention will be described more in detail with reference to the flowcharts shown in FIGS. 34 and 35.

Figure 32A:
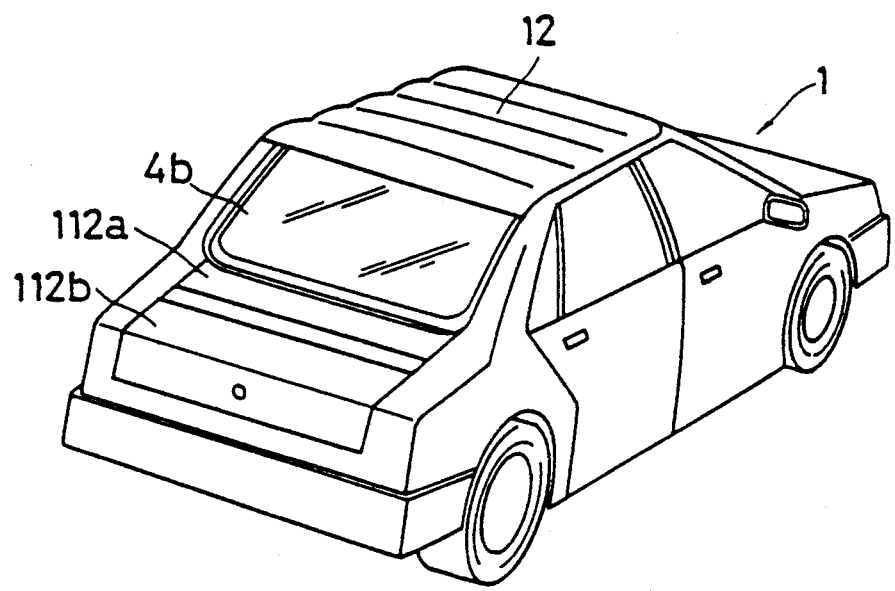

As shown in FIGS. 27 and 32(a), when the top 12 is used to cover the roof panel opening 3 of the roof panel 2—in this embodiment, the opening 10 of the base frame 9 on the roof side, it takes the first posture. In the first posture, the top 12 is maintained in a state in which it covers the opening 10 of the base frame 9 by matching the force applied by the drive means 37 forwardly pushing the front hard portion 13 against the urging force of the urging means 65 interposed between the front hard portion 13 and the rear hard portion 14 with the force for regulating forward movement by engagement of the rearward projection 64 mounted on the rear hard portion 14 with the engagement piece 66 projected on the side of the base frame 9.

Operation of the top 12 at the first posture will be carried out to open in a manner as will be described hereinbelow with reference to FIG. 34.

At step S1, the switch 160 for opening the top 12 is turned on and, at step S2, the first limit switch 154 is turned on upon contact with the connecting jig 25 mounted on the front hard portion 13 of the top 12 in closed state. Then at step S3, the microcomputer 159 generates an instruction output for driving the reversible motor 40 constituting the drive means 37 for opening or closing the top. Driving the rotation of the reversible motor 40 in the normal direction on the basis of the instruction rotates the gear 39 in a normal direction to thereby move relatively the drive wires 38 in the direction shown by the arrow X in the drawing. This pulls rearwardly the front hard portion 13 of the top 12 connected to the forward ends of the drive wires 38 and 38 through the connecting jigs 25 and 25 by the urging force applied by the urging means 65 and the top 12 is folded at a position at which the urging means 65 becomes in a free state. Thereafter, the top 12 is transferred forwardly while being guided. by the second guide portions 21 and 21. In the course of transferral, at step S4, the second limit switch 155 is turned on upon contact with the guide piece 18 mounted on the rear hard portion 14 of the top 12. In response to an ON signal from the second limit switch 155, the microcomputer 159 then provides an instruction to suspend rotation of the reversible motor 40 and the rearward movement of the top 12. Simultaneously, the lid-opening/closing motor 150 constituting the drive means 149 for opening or closing the lid is driven at step S6 and the driving of the motor 150 for opening or closing the lid rotates the worm gear 151 and the bevel gear 152, thereby displacing the link mechanism 153 upon rotation of the bevel gear 152 and thus operating the subsidiary lid 112a in a manner as indicated by the dotted line in FIG. 29. Termination of the opening operation of the subsidiary lid 112a is detected by an ON operation of the fourth limit switch 157 at step S7. At this time, the driving of the motor 150 for opening or closing the lid is suspended at step S8 and, at the same time, the driving of a rotation of the reversible motor 40 in a normal direction is resumed at step S9, thus resuming the rearward movement of the top 12.

Figure 32B:
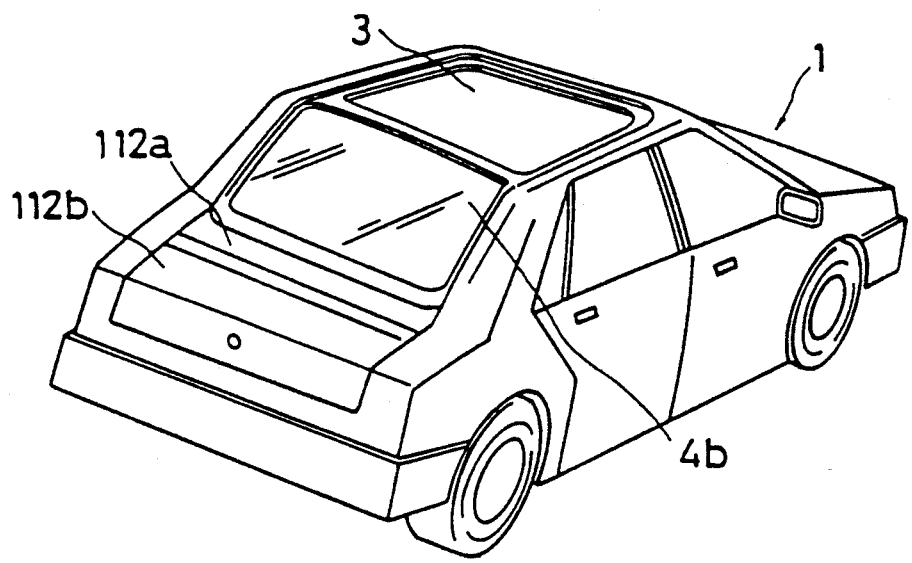

When the top 12 has been housed or accommodated completely, the third limit switch 156 is turned on upon contact with the guide piece. 18 at step S10. Then an ON signal from the third limit switch 156 is generated to and received by the microcomputer 159 which, in turn, provides an instruction to suspend the rotation of the reversible motor 40 at step S11. Simultaneously, the motor 150 for opening or closing the lid is driven again at step S12. Driving the motor 150 for opening or closing the lid rotates the worm gear 151 and the bevel gear 152 displacing the link mechanism 153 to operate the subsidiary lid 112a to the closed state as indicated by the solid line in FIG. 29 from the open state as indicated by the dotted line therein. Termination of the operation to close the subsidiary lid 112a is detected by causing the fifth limit switch 158 to be turned on at step S13 and the driving of the motor 150 for opening or closing the lid is then suspended at step S14. This operation permits an accommodation or housing of the top 12 in a folded state in the subsidiary room 8a of the trunk room 8. In other words, the top 12 takes the second posture in which it is accommodated or housed in the trunk room 8 as shown in FIG. 32(b). In the second posture, the roof panel opening 3—in this embodiment, the opening 10 of the base frame 9 on its roof side—is in a fully open state, thereby providing an open air feeling to the passengers. In the state in which the top 12 takes the second posture at which it is housed in the subsidiary room 8a of the trunk room 8, air resistance during motion is not increased, so it is extremely advantageous from the standpoint of air resistance.

Description on the operation for closing the top 12 will be described in accordance with the flowchart shown in FIG. 35.

At step S21, the switch 161 for opening or closing the lid is turned on and this operation permits the third limit switch 156 to be turned on at step S22 because it is in contact with the guide piece 18 mounted on the rear hard portion of the top 12 in a state in which it is housed or accommodated in the subsidiary room 8a. This ON signal is input to the microcomputer 159 which, in turn, qenerates an instruction to drive the motor 150 for opening or closing the lid at step S23. Rotation of the motor 150 drives the rotation of the worm gear 151 and the bevel gear 152 displacing the link mechanism 153 to operate the subsidiary lid 112a to move to the open state as indicated by the dotted line in FIG. 29. Completion of the opening operation of the subsidiary lid 112a is detected by the fourth limit switch 157 which is turned on at step S24. At this point in time, the rotation of the motor 150 is suspended at step S25 and the reversible motor 40 is driven in a reverse rotation at step S26. This reverse rotation of the reversible motor 40 rotates the gear 39 in a reverse direction transferring the drive wires 38 and 38 relatively in the direction indicated by the arrow Y in FIG. 12. The relative movement pushes forwardly the front hard portion 13 of the top 12 connected to the forward ends of the drive wires 38 and 38 through the connecting jigs 25 and 25, resulting in a forward movement of the top 12 while being guided by the second guide portions 21 and 21. In the course of this movement, at step S27, the second limit switch 155 is turned on upon contact with the guide piece 18 mounted on the rear hard portion 14 of the top 12. In response to an ON signal from the second limit switch 155, the microcomputer 159 gives an instruction to suspend the rotation of the reversible motor 40 and simultaneously to suspend the forward movement of the top 12 at step S28. At the same time, the motor 150 for opening or closing the lid is driven again at step S29 and an alarm buzzer 162 is turned on to draw attention to passengers that the top 12 is in the course of the closing operation at step S30. Driving the motor 150 rotates the worm gear 151 and the bevel gear 152, and the rotation of the gears displaces the link mechanism 153 operating the subsidiary lid 112a to move to the closed state as indicated by the solid line from the open state as indicated by the dotted line in FIG. 29. The fact that the closing operation of the subsidiary lid 112a has been finished is sensed by the turning-on of the fifth limit switch 158 at step S31 and, at this time, the driving of the motor 150 is suspended at step S32. Thereafter, the rotation of the reversible motor 40 in a reverse direction is resumed at step S33, resuming a forward movement of the lid 12 and moving the lid 12 in a forward direction to a position at which the rearward projection 64 of the rear hard portion 14 of the top 12 is brought into engagement with the engagement piece 66 projected on the side of the base frame 9. Then the front hard portion 13 of the top 12 is forced to be moved up to the forward edge of the opening 10 of the base frame 9 on its roof side against the urging force of the urging means 65, whereby the top 12 is moved to take the first posture where the roof panel opening 3, i.e., the opening 10 of the base frame 9 on its roof side, is fully closed as shown in FIGS. 27 and 32(a). As the closing of the roof panel opening 3, or the opening 10 on the roof side of the base frame 9, has been finished, the first limit switch 154 is turned on upon contact with the connecting jig 25 at step S34, turning the alarm buzzer 162 off at step S35 and suspending the driving of the reversible motor 40 at step S36.

As has been described hereinabove, this embodiment is designed such that the microcomputer 159 is operated to control the drive means 37 for opening or closing the top and the drive means 149 for opening or closing the lid, thus permitting an automatic control over the opening and closing of the top 12 and the subsidiary lid 112a.

The present invention has been described by way of examples, but it is to be noted herein that the flexible top 12 may selectively take its first and second postures through manual operation. In this case, the flexible top 12 may be provided with a handle or a concave portion which can be used with fingers.

The present invention may be embodied in other specific forms without departing from the spirit and scope hereof. The present embodiments as have been described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A flexible top apparatus for a vehicle, comprising:
   a roof panel connected to a vehicle body through at least a pair of left-hand and right-hand front pillars and a pair of left-hand and right-hand rear pillars;
   said roof panel having therein a roof panel opening surrounded by a front header, a pair of left-hand and right-hand roof side rails and a rear header;
   a rear window glass panel fixed to said pair of left-hand and right-hand rear pillars and said rear header; and
   a flexible top which can be extended and contracted in a longitudinal direction of the vehicle body and which is as large in size in its extended state as said roof panel opening in order to close said roof panel opening;
   wherein said flexible top is in abutment at its forward end portion with said front header, at its left-hand and right-hand side end portions with said left-hand and right-hand roof side rails, and at its rearward end portion with said rear header when said roof panel opening is closed by said flexible top in its extended state; and
   wherein said flexible top is displaceable along said left-hand and right-hand roof side rails and left-hand and right-hand pillars so as to selectively take a first posture and a second posture, said first posture being taken by said flexible top in its extended state, said second posture being taken when said flexible top is housed or accommodated in its contracted state at a position to the rear of and below a lower portion of said rear window glass panel.

2. A flexible top apparatus as claimed in claim 1, wherein said flexible top comprises a front hard portion constituting a forward end portion of said flexible top of a hard plate form, a rear hard portion constituting a rearward end portion thereof in a hard plate form, and a leather top portion comprising a flexible sheet connecting said front hard portion to said rear hard portion and said flexible top is foldable by flexibility produced by said leather top portion.

3. A flexible top apparatus as claimed in claim 2, wherein:
   said rear header is provided with an engagement piece in a fixed manner; and
   said rear hard portion is provided with a rearward projection so as to be abuttable with said engagement piece from rearward; and
   said rear hard portion is regulated so as not to be displaced forwardly from a position at which said flexible top is in a closed state due to abutment of said engagement piece with said projection.

4. A flexible top apparatus as claimed in claim 3, further comprising an urging means for urging so as to allow said front hard portion and said rear hard portion to come closer to each other.

5. A flexible top apparatus as claimed in claim 2, wherein said flexible top takes a third posture in which said front hard portion is in a folded state at a position adjacent said rear hard portion in a state in which said rear hard portion is in abutment with said rear header and said flexible top maintains its folded state between said third and second postures.

6. A flexible top apparatus as claimed in claim 3, further comprising a drive means for driving said front hard portion and altering a posture of said flexible top between said first and second postures.

7. A flexible top apparatus as claimed in claim 6, wherein said drive means comprises a motor and a drive wire connected at one end portion to said front hard portion and drivable reciprocally by said motor.

8. A flexible top apparatus as claimed in claim 1, wherein said pair of left-hand and right-hand roof side rails and said pair of left-hand and right-hand rear pillars are provided each with a guide portion for guiding left-hand and right-hand side end portions of said flexible top, respectively, and said guide portion comprises a first guide portion extending in a longitudinal direction of said vehicle body along said roof side rails and a second guid portion communicating with said first guide portion and extending virtually along said rear pillars.

9. A flexible top apparatus as claimed in claim 8, wherein said guide rail with said guide portion is separately formed as said roof side rail and as said rear pillar and said fixed to said roof side rail and said rear pillar.

10. A flexible top apparatus as claimed in claim 1, wherein:
said flexible top is flexible as a whole and windable;
a winding rod extending in a transverse direction is rotatably disposed at a position rearward of said rear window glass panel and at a lower end portion thereof; and
said winding rod is connected to a rear end portion of said flexible top by a connecting belt.

11. A flexible top apparatus as claimed in claim 10, wherein a winding roll is provided so as to be urged in a direction in which said flexible top is wound.

12. A flexible top apparatus as claimed in claim 11, further comprising a drive means for driving a forward end portion of said flexible top.

13. A flexible top apparatus as claimed in claim 12, wherein said drive means comprises a motor and a drive wire drivable reciprocally by said motor and connected at its one end portion to said forward portion of said flexible top.

14. A flexible top apparatus as claimed in claim 1, wherein said vehicle body is provided with a concave portion in a position to the rear of and below a lower end portion of said rear window glass panel for housing said flexible top in said second posture.

15. A flexible top apparatus as claimed in claim 14, wherein said concave portion is provided with a lid member for closing said concave portion so as to house said flexible top in said concave portion.

16. A flexible top apparatus as claimed in claim 15, wherein:
a trunk room is provided in a position rearward of a lower portion of said rear window glass panel;
said trunk room comprises a subsidiary room constituting said concave portion and a main room located in a position rearward of said subsidiary room;
a trunk lid for closing said trunk room comprises a subsidiary lid for opening or closing said subsidiary room and a main lid for opening or closing said main room; and
said subsidiary lid is opened in front and said main lid is opened in rear.

17. A flexible top apparatus as claimed in claim 15, further comprising:
a first drive means for driving said flexible top between said first posture and said second posture;
a second drive means for driving said lid member for opening or closing;
a drive control means for closing said lid member at a usual time by controlling said second drive means in synchronization with said first drive means or for opening said lid member when said flexible top is taken in or from said concave portion.

18. A flexible top apparatus as claimed in claim 14, wherein:
said flexible top comprises a front hard portion constituting a forward end portion of said flexible top of a hard plate form, a rear hard portion constituting a rearward end portion thereof in a hard plate form, and a leather top portion comprising a flexible sheet connecting said front hard portion to said rear hard portion and said flexible top is foldable by flexibility produced by said leather top portion:
a connecting jig is provided so as to be displaced along said roof side rails and said rear pillars;
said connecting jig is connected to said front hard portion through a link mechanism; and
a cam for link operation acting on said link mechanism in vicinity of said concave portion and inclining said front hard portion so as to become substantially horizontal in accordance with a displacement of said connecting jig toward said concave portion;
in which said concave portion is covered with said front hard portion in a substantially horizontal state when said flexible top takes said second posture.

19. A flexible top apparatus as claimed in claim 18, further comprising:
a drive wire disposed displacibly along said roof side rails and said rear pillars and connected at its one end portion to said connecting jig; and
a motor for reciprocally driving said drive wire.

20. A flexible top apparatus as claimed in claim 14, wherein said flexible top is displaceable to a third posture in which said flexible top assumes a contracted state in a position near said rear header.

* * * * *